United States Patent
Misawa

(10) Patent No.: US 8,152,388 B2
(45) Date of Patent: Apr. 10, 2012

(54) POWER TRANSMISSION MECHANISM HAVING CAM-INCORPORATED GEAR, AND POWER TRANSMISSION MECHANISM OF IMAGING APPARATUS

(75) Inventor: Masayuki Misawa, Tokyo (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 122 days.

(21) Appl. No.: 12/814,738

(22) Filed: Jun. 14, 2010

(65) Prior Publication Data

US 2010/0322615 A1 Dec. 23, 2010

(30) Foreign Application Priority Data

Jun. 19, 2009 (JP) ................................ 2009-145943

(51) Int. Cl.
G03B 19/12 (2006.01)
(52) U.S. Cl. ........................................ 396/358; 396/502
(58) Field of Classification Search .................. 396/358, 396/502
See application file for complete search history.

(56) References Cited

U.S. PATENT DOCUMENTS

| 5,079,574 | A  | * | 1/1992 | Ueno ............................ 396/177 |
| 5,878,296 | A  |   | 3/1999 | Ogi et al. |
| 6,174,093 | B1 | * | 1/2001 | Kitazawa et al. ............. 396/358 |
| 2004/0062540 | A1 | * | 4/2004 | Misawa ......................... 396/387 |
| 2007/0253700 | A1 | * | 11/2007 | Okumura ..................... 396/358 |

FOREIGN PATENT DOCUMENTS

JP 3153482 1/2001

OTHER PUBLICATIONS

U.S. Appl. No. 12/777,455 to Masayuki Misawa, filed May 11, 2010.
U.S. Appl. No. 12/814,693 to Masayuki Misawa, filed Jun. 14, 2010.
"Asahi Camera", Asahi Shimbun Publications Inc., Printed edition, Aug. 2008, pp. 202-203.
"Asahi Camera", Asahi Shimbun Publications Inc., Printed edition, Jan. 2008, pp. 230-231.

* cited by examiner

Primary Examiner — W. B. Perkey
Assistant Examiner — Fang-Chi Chang
(74) Attorney, Agent, or Firm — Greenblum & Bernstein P.L.C.

(57) ABSTRACT

A power transmission mechanism includes a cam-incorporated gear which rotates in one rotational direction by a driving force transmitted from a drive source via a planet gear when engaged with the planet gear, wherein the cam-incorporated gear stops rotating when disengaged from the planet gear; a driven member which includes a follower which contacts at least one surface cam formed on the cam-incorporated gear, the driven member being driven in accordance with the rotation of the cam-incorporated gear in the one rotational direction, and exerting a surplus torque on the cam-incorporated gear in the one rotational direction thereof so as to increase the rotation of the cam-incorporated gear in the one rotational direction, the surplus torque being independent of a torque exerted on the cam-incorporated gear by the drive source; and a damping mechanism which continuously exerts a load torque on the cam-incorporated gear in a rotational direction opposite to the one rotational direction of the cam-incorporated gear so as to cancel out the surplus torque.

15 Claims, 24 Drawing Sheets

POWER TRANSMISSION MECHANISM HAVING CAM-INCORPORATED GEAR, AND POWER TRANSMISSION MECHANISM OF IMAGING APPARATUS

BACKGROUND OF THE INVENTION

1. Field of the Invention

The present invention relates to a power transmission mechanism having at least one cam-incorporated gear, and in particular, relates to a type of power transmission mechanism having at least one cam-incorporated gear and a planetary gear mechanism used to transmit rotation to the cam-incorporated gear. The present invention also relates to a power transmission mechanism of an imaging apparatus.

2. Description of the Related Art

In addition to a conventional object viewing function (optical view mode) using an optical viewfinder, SLR digital cameras having a 'live view mode', in which an electronic object image captured by an image sensor is viewed in real-time on a display monitor such as an LCD before photographing, are known in the art. In the live view mode, the quick-return mirror (hereinafter referred simply to as the mirror) is held in the retracted position (mirror-up position) in which the quick-return mirror is retracted from a photographing optical path when the object is viewed before photographing, which is different from a viewing state in the optical view mode, in which the object is viewed through an optical viewfinder before photographing. Therefore, when a photographing operation is performed in the live view mode, the mirror drive operation and the shutter drive operation need to be controlled in a different manner from those in optical view mode (normal exposure mode).

In the SLR digital camera disclosed in Non-Patent Document 1 (pages 202 and 203 in "Asahi Camera" (a Japanese monthly photographic magazine published by Asahi Shimbun Publications Inc., print edition, August 2008), another image sensor (live-view image sensor) used exclusively for capturing the object image in the live view mode, independently of an image sensor used for taking pictures, is installed in a viewfinder optical system so that a quasi-live view operation can be performed using the live-view image sensor in the viewfinder optical system. In this type of camera, an electronic image captured by an image sensor different from the image sensor used at a time of exposure is viewed on a display monitor before shooting, and accordingly, this view mode cannot be considered to be live view mode in the strict sense, as there is a possibility of the image displayed on the monitor not precisely coinciding with the image taken at a time of exposure. Additionally, installation space for an image sensor needs to be secured in the viewfinder, which becomes an obstacle for miniaturization of the camera and causes an increase in production cost.

In the SLR digital camera disclosed in Non-Patent Document 2 (pages 230 and 231 in "Asahi Camera" (a Japanese monthly photographic magazine published by Asahi Shimbun Publications Inc., print edition, January 2008), the mirror drive mechanism and the shutter drive mechanism are provided with two independent drive sources, respectively, and a shutter charge operation is performed by the shutter drive mechanism with a mirror-up state being maintained by the mirror drive mechanism in a photographing operation in the live view mode. In this type of camera, a mirror drive system and a shutter drive system are each provided with an independent drive source and an independent drive mechanism, which makes it difficult to achieve miniaturization and weight reduction of the camera and causes an increase in production cost.

The applicant of the present invention has found that miniaturization, weight reduction and cost reduction of the camera body can be achieved in an SLR camera having a live view mode by solving the above described problems that reside in Non-Patent Documents 1 and 2 by employing a planetary gear mechanism as a mechanism for transmitting driving force of a motor to a mirror drive system (mechanism) and a shutter charge system (mechanism). Specifically, the intention is to carry out a photographing operation (sequence of processes for taking a picture) in the live view mode by a drive mechanism equipped with two cam-incorporated gears like the drive mechanism shown in Japanese Patent No. 3,153,482 and to transmit a driving force selectively to the two cam-incorporated gears via a planetary gear mechanism. However, it is difficult to use a planetary gear mechanism as a device for transmitting a driving force selectively to such two cam-incorporated gears in the following respects.

A planetary gear mechanism has a basic structure such that rotation of a drive source (motor) is transmitted from a sun gear rotated by the drive source to a planet gear and that a state of the planet gear is switched between two different states: a state of being engaged with a driven gear so that rotation of the planet gear is transmitted to the driven gear and a state of being disengaged from the driven gear (to be engaged with another driven gear), in accordance with the direction of rotation of the sun gear. Although a certain degree of load (rotational resistance) acts on the driven gear from a driven member to which a driving force is transmitted via driven gear, there is a possibility of a torque in the rotational direction of the driven gear (surplus torque) acting on the driven gear if the load characteristics of the driven member fluctuate. If such a surplus torque acts on the driven gear, a state where the relationship between the planet gear and the driven gear, that serve as a driver and a follower, respectively, is reversed so that the driven gear serves as if it were a driving source occurs. Under such conditions, if it is attempted to make the planet gear engaged with the driven gear, there is a possibility of the planet gear behaving in a manner so as to bounce on the driven gear, which may disable the control of the driven member by the driven gear.

For instance, in the SLR camera disclosed in Japanese Patent No. 3,153,482, a mirror up/down operation and a shutter charge operation are performed by one of the two cam-incorporated gears, and an adjustable diaphragm is controlled by rotation of the other cam-incorporated gear. The driven members of the mirror drive system, the shutter charge system and the diaphragm control system are each provided with a swingable lever which swings by being guided by a surface cam formed on the associated cam-incorporated gear, and each swingable lever is biased to rotate in a direction to come in contact with this surface cam. When each swingable lever is pressed to rotate in a direction against such a biasing force by the associated surface cam, a torque (load torque) in a direction opposite to the rotational direction of the cam-incorporated gear acts on the cam-incorporated gear; however, when the swingable lever rotates in the opposite direction, the biasing force acting on the swingable lever acts on the cam-incorporated gear as surplus torque. Since the swingable levers of the mirror drive system, the shutter charge system and the diaphragm drive system are each rotated to and fro during one turn of the associated cam-incorporated gear, it is sometimes the case that the surplus torque caused by any one swingable lever strongly acts on the associated cam-incorporated gear depending on the rotation position of the cam-incorporated gear. Due to this reason, assuming that a planetary gear mechanism is used as a driving force transmitter for transmitting a driving force to the cam-incorporated gear, there is a possibility of a poor engagement of the planet gear with the cam-incorporated gear occurring.

SUMMARY OF THE INVENTION

The present invention provides a power transmission mechanism capable of reliably controlling the driving of each driven member with no possibility of faulty engagement of the planet gear with a cam-incorporated gear(s), and in particular, provides such a power transmission mechanism which is suitable for an imaging apparatus.

According to an aspect of the present invention, a power transmission mechanism is provided, including a cam-incorporated gear which rotates in one rotational direction by a driving force transmitted from a drive source via a planet gear when engaged with the planet gear, wherein the cam-incorporated gear stops rotating when disengaged from the planet gear; a driven member which includes a follower which contacts at least one surface cam formed on the cam-incorporated gear, the driven member being driven in accordance with the rotation of the cam-incorporated gear in the one rotational direction, and exerting a surplus torque on the cam-incorporated gear in the one rotational direction thereof so as to increase the rotation of the cam-incorporated gear in the one rotational direction, the surplus torque being independent of a torque exerted on the cam-incorporated gear by the drive source; and a damping mechanism which continuously exerts a load torque on the cam-incorporated gear in a rotational direction opposite to the one rotational direction of the cam-incorporated gear so as to cancel out the surplus torque.

Although the damping mechanism can be of any type as long as it exerts a rotational load on the cam-incorporated gear, as an example, the damping mechanism can be a frictional gear mechanism including a friction gear engaged with the cam-incorporated gear, and a friction spring which imposes a load on the friction gear.

It is desirable for the cam-incorporated gear to include a first cam-incorporated gear and a second cam-incorporated gear with which the planet gear is selectively engaged, and for the frictional gear mechanism to include a first frictional gear mechanism including a first friction gear which is engaged with the first cam-incorporated gear, and a second frictional gear mechanism including a second friction gear which is engaged with the second cam-incorporated gear. When the first cam-incorporated gear is rotated by the driving force transmitted from the drive source via the planet gear, the first friction gear rotates while exerting the load torque on the first cam-incorporated gear, wherein rotation of the second cam-incorporated gear and the second friction gear are stopped. When the second cam-incorporated gear is rotated by the driving force transmitted from the drive source via the planet gear, the second friction gear rotates while exerting the load torque on the second cam-incorporated gear, wherein rotation of the first cam-incorporated gear and the first friction gear are stopped.

A pair of gear support members can be provided, which support the friction gear in a manner to prevent the friction gear from moving in a direction of the rotational axis thereof. In this case, it is desirable for the friction spring to be a compression spring installed between one of the pair of support members and the friction gear.

In an alternative embodiment of the damping mechanism, the damping mechanism can magnetically impose a rotational resistance on one of the cam-incorporated gear and a gear engaged with the cam-incorporated gear.

The present invention is suitably applied to a power transmission mechanism in which a drive member driven by a cam-incorporated gear is a swingable member. More specifically, the driven member can include at least one swingable member which is swingable between a first swing limit at which the follower is positioned in a close vicinity of a rotational shaft of the cam-incorporated gear and a second swing limit at which the follower is positioned away from the rotational shaft, the swingable member being biased toward the first swing limit. The swingable member exerts the surplus torque on the cam-incorporated gear when the swingable member swings from the second swing limit to the first swing limit. The damping mechanism operates so as to counter the surplus torque caused by the swingable member.

It is desirable for swing operations of two of the swingable members to be controlled by one and the other of two of the surface cams, respectively. When one of the two swingable members exerts the surplus torque on the cam-incorporated gear, the other of the two swingable members exerts a load torque on the cam-incorporated gear in a rotational direction opposite to the one rotational direction of the cam-incorporated gear, in which the one of the two swingable members exerts the surplus torque on the cam-incorporated gear, independently of the damping mechanism.

It is desirable for the cam-incorporated gear to be installed in an imaging apparatus, the imaging apparatus including a mirror which is swingable between a viewing position in which light from an imaging optical system is reflected by the mirror to travel toward a viewfinder optical system, and a retracted position in which the light from the imaging optical system is incident on an image pickup medium without being reflected by the mirror; and a shutter which prevents the light that is passed through the imaging optical system from being incident on the image pickup medium when shut, and allows the light that is passed through the imaging optical system to be incident on the image pickup medium when opened. One of the two swingable members includes a mirror drive lever which holds the mirror in the viewing position when positioned in the first swing limit and holds the mirror in the retracted position when positioned in the second swing limit. The other of the swingable members includes a shutter charge lever which allows the shutter to travel when positioned in the first swing limit and charges the shutter when positioned in the second swing limit.

It is desirable for the cam-incorporated gear to be installed in an imaging apparatus including a shutter which prevents light that is passed through an imaging optical system from being incident on an image pickup medium when shut, and allows the light that is pass through the imaging optical system to be incident on the image pickup medium when opened. The swingable member includes a shutter charge lever which allows the shutter to travel when positioned in the first swing limit and charges the shutter when positioned in the second swing limit.

It is desirable for the power transmission mechanism to be incorporated in an imaging apparatus, the imaging apparatus including a mirror swingable between a viewing position in which light from an imaging optical system is reflected by the mirror to travel toward a viewfinder optical system and a retracted position in which the light from the imaging optical system is incident on an image pickup medium without being reflected by the mirror; and a shutter which prevents the light that is passed through the imaging optical system from being incident on the image pickup medium when shut, and allows the light that is passed through the imaging optical system to be incident on the image pickup medium when opened. The swingable member includes a mirror drive lever for holding the mirror in the viewing position when positioned in the first swing limit and for holding the mirror in the retracted position when positioned in the second swing limit; and a shutter charge lever which allows the shutter to travel when positioned in the first swing limit and charges the shutter when positioned in the second swing limit. The cam-incorporated gear includes a first cam-incorporated gear and a second cam-incorporated gear with which the planet gear is selectively engaged. The first cam-incorporated gear includes a mirror-control surface cam for controlling a swing operation of the mirror drive lever, and a first shutter-control surface cam for controlling a swing operation of the shutter charge lever. The second cam-incorporated gear includes a second shutter-control surface cam for controlling a swing operation of the shutter charge lever. The damping mechanism includes a first damping mechanism which exerts the load torque on the first cam-incorporated gear, and a second damping mechanism which exerts the load torque on the second cam-incorporated gear.

It is desirable for the first damping mechanism to include a first frictional gear mechanism including a first friction gear, which is engaged with the first cam-incorporated gear, and a first friction spring which imposes a load on the first friction gear, and for the second damping mechanism to include a second frictional gear mechanism including a second friction gear, which is engaged with the second cam-incorporated gear, and a second friction spring which imposes a load on the second friction gear. The first friction gear and the second friction gear are rotatably supported by a mirror box, in which the mirror is swingably supported. The first friction spring is provided between the first friction gear and the mirror box, and the second friction spring is provided between the second friction gear and the mirror box.

It is desirable for the driving force to be transmitted from the drive source to the cam-incorporated gear via a reduction gear train and the planet gear.

It is desirable for the power transmission mechanism to be incorporated in an SLR camera.

In an embodiment, a power transmission mechanism of an imaging apparatus is provided, including a mirror swingable between a viewing position in which light from an imaging optical system is reflected by the mirror to travel toward a viewfinder optical system and a retracted position in which the light from the imaging optical system is incident on an image pickup medium without being reflected by the mirror; a cam-incorporated gear which rotates in one rotational direction by a driving force transmitted from a drive source via a planet gear when engaged with the planet gear, and stops rotating when disengaged from the planet gear; a mirror drive lever which includes a follower which comes in sliding contact with a surface cam formed on the cam-incorporated gear, wherein the mirror drive lever is swingable between a first swing limit at which the follower is positioned in a vicinity of a rotational shaft of the cam-incorporated gear and a second swing limit at which the follower is positioned away from the rotational shaft of the cam-incorporated gear, holds the mirror in the viewing position when positioned in the first swing limit, holds the mirror in the retracted position when positioned in the second swing limit, and exerts a surplus torque on the cam-incorporated gear in a rotational direction thereof so as to increase the rotation of the cam-incorporated gear in the rotational direction when rotating from the second swing limit to the first swing limit, the surplus torque being independent of a torque exerted on the cam-incorporated gear by the drive source; and a damping mechanism which continuously exerts a load torque on the cam-incorporated gear in a rotational direction opposite to the rotational direction of the cam-incorporated gear so as to cancel out the surplus torque.

In an embodiment, a power transmission mechanism of an imaging apparatus is provided, including a shutter which prevents light from being incident on an image pickup medium when shut, and allows the light to be incident on the image pickup medium when opened; a cam-incorporated gear which rotates in one rotational direction by a driving force transmitted from a drive source via a planet gear when engaged with the planet gear, and stops rotating when disengaged from the planet gear; a shutter charge lever which includes a follower which comes in sliding contact with a surface cam formed on the cam-incorporated gear, wherein the shutter charge lever is swingable in accordance with a rotation of the cam-incorporated gear between a first swing limit at which the follower is positioned in a vicinity of a rotational shaft of the cam-incorporated gear and a second swing limit at which the follower is positioned away from the rotational shaft of the cam-incorporated gear, allows the shutter to travel when positioned in the first swing limit and makes the shutter charged when positioned in the second swing limit, and exerts a surplus torque on the cam-incorporated gear in a rotational direction thereof so as to increase the rotation of the cam-incorporated gear in the rotational direction when rotating from the second swing limit to the first swing limit, the surplus torque being independent of a torque exerted on the cam-incorporated gear by the drive source; and a damping mechanism which continuously exerts a load torque on the cam-incorporated gear in a rotational direction opposite to the rotational direction of the cam-incorporated gear so as to cancel out the surplus torque.

According to the power transmission mechanism of the present invention, since the surplus torque (which is caused by the driven member and acts on the cam-incorporated gear so as to increase rotation of the cam-incorporated gear in a predetermined driving direction thereof) can be prevented from acting on the cam-incorporated gear, there is no possibility of a poor engagement of the planet gear with the cam-incorporated gear occurring, which makes it possible to carry out reliable drive control. In addition, since the magnitude of the load torque exerted on the cam-incorporated gear by the damping mechanism can be set to any desired magnitude, the cam curve (cam profile) can be designed with a high degree of freedom without restrictions associated with the surplus torque that is exerted on the cam-incorporated gear by the drive member.

The present disclosure relates to subject matter contained in Japanese Patent Application No. 2009-145943 (filed on Jun. 19, 2010) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
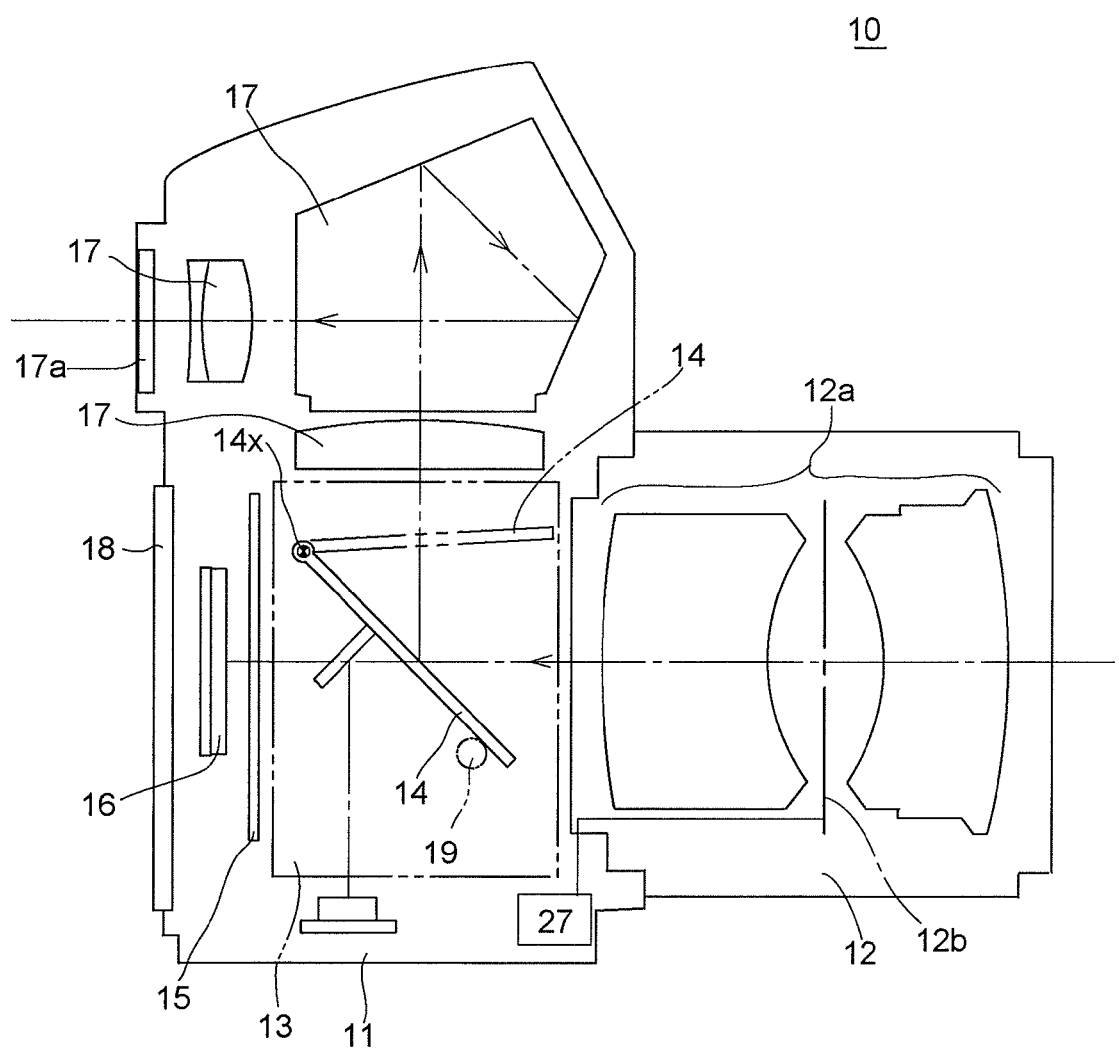
FIG. 1 is a schematic diagram of an optical system of an SLR camera as an example of an imaging apparatus to which a power transmission mechanism according to the present invention is applied.

An SLR digital camera (hereinafter referred simply to as the camera) 10 shown in FIG. 1 is an embodiment of an imaging apparatus according to the present invention. The camera 10 is provided on the front of a camera body 11 with a lens mount (ring-shaped mount) to which a lens barrel (interchangeable lens) 12 is detachably attached, and is further provided behind the lens mount with a mirror box (gear support member) 13. The camera 10 is provided in the mirror box 13 with a quick-return mirror (hereinafter referred simply to as the mirror) 14 which is supported by the mirror box 13 to be swingable about a laterally-extending mirror sheet hinge 14x fixed to the mirror box 13. The camera 10 is provided behind the mirror 14 with a focal plane shutter (hereinafter referred simply to as the shutter) 15 and is provided behind the shutter 15 with an image sensor (image pickup medium) 16.

Figure 5:
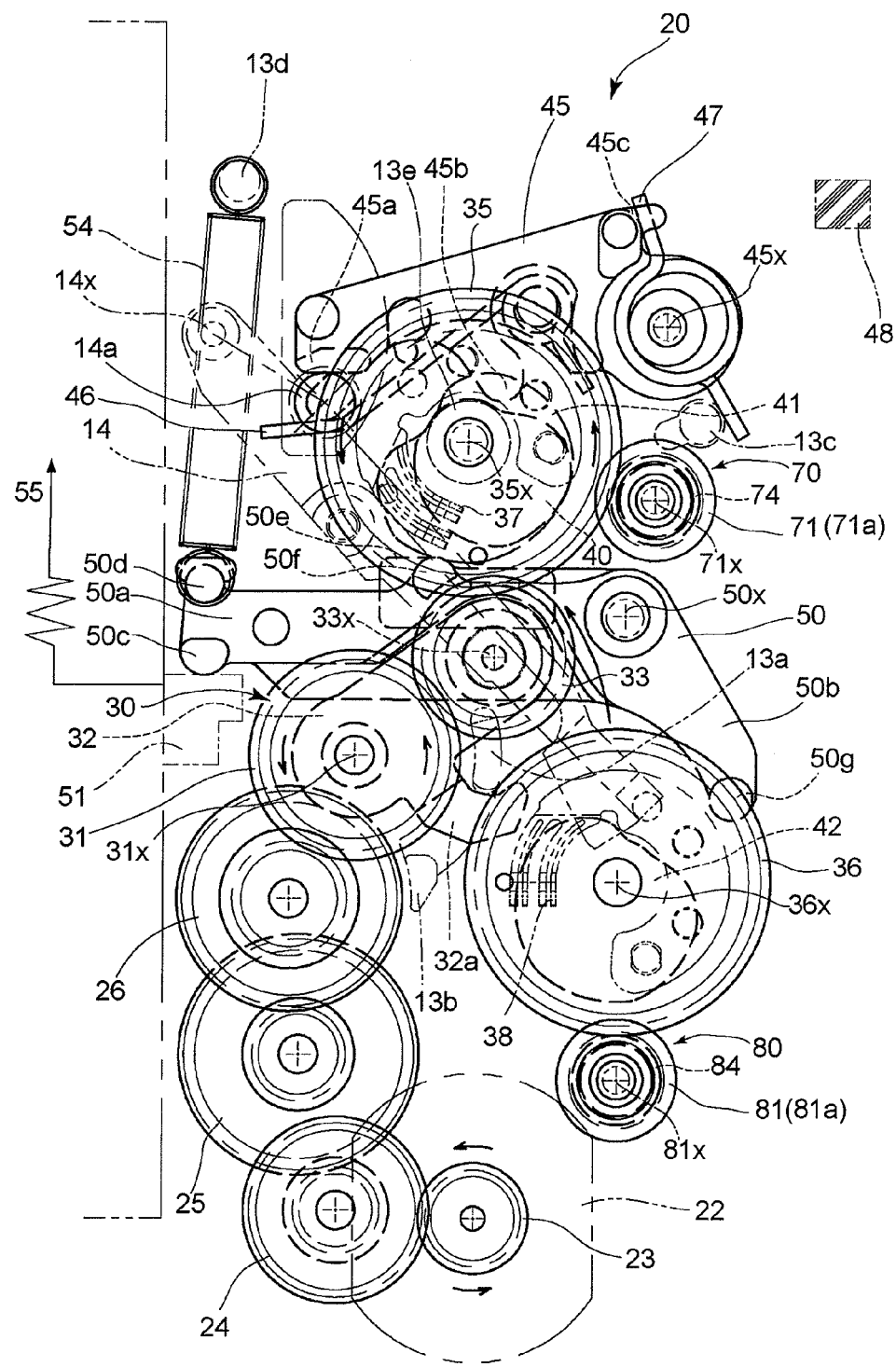
FIG. 5 is aside elevational view of the mirror/shutter drive mechanism in an initial state of a normal photography operational-sequence, in which the mirror is held in the down position (viewing position) on a photographing optical path and the shutter charge operation has been completed.

As shown in FIGS. 1 and 5, the mirror 14 is driven to swing between two positions: a down position (viewing position; shown by a solid line in FIG. 1 and a two-dot chain line in FIG. 5) in which the mirror 14 is positioned in a photographing optical path from a photographic lens (imaging optical system) 12a positioned inside the lens barrel 12 to the image sensor 16, and an upward retracted position (shown by a two-dot chain line in FIGS. 1 and 5) in which the mirror 14 is retracted upward from the aforementioned photographing optical path. The mirror 14 includes a mirror and a mirror sheet which supports the mirror thereon. The portion of the mirror 14 which is shown by two-dot chain lines in FIGS. 5 through 8 is the mirror sheet of the mirror 14. When the mirror 14 is in the down position, light reflected by the mirror 14 is incident on a viewfinder optical system 17 (including a pentagonal prism and an eyepiece) to be viewed as an object image through an eyepiece opening 17a. On the other hand, when the mirror 14 is in the upward retracted position, light passed through the photographic lens 12a travels toward the shutter 15 without being reflected by the mirror 14, and this light can be made incident on the light receiving surface of the image sensor 16 by opening the shutter 15. The camera body 10 is provided on the back of the camera body 11 with an LCD monitor 18. Electronic object images obtained via the image sensor 16 and various information other than electronic object images can be indicated on the LCD monitor 18.

The shutter 15 is provided with a leading curtain 15a and a trailing curtain 15b (both indicated in FIG. 2), each of which can travel in a plane orthogonal to an incident optical axis relative to the image sensor 16. In the operation of the shutter 15 at a time of exposure, the leading curtain 15a and the trailing curtain 15b travel in order with a predetermined time difference therebetween and are thereupon brought back to their previous positions (initial positions) by a shutter charge operation which will be discussed later. The camera 10 is provided therein with a shutter setting lever 51 provided as an element associated with the leading curtain 15a and the trailing curtain 15b of the shutter 15. The shutter setting lever 51 is supported to be swingable about a shaft (not shown). The portion of the shutter setting lever 51 which appears in FIGS. 4 through 8, 15 through 18, and 20 through 23 is a free end of the shutter setting lever 51. A swinging movement of the shutter setting lever 51 causes the position of the free end of the shutter setting lever 51 to vary in the vertical direction. The leading curtain 15a and the trailing curtain 15b are mechanically prevented from traveling by the shutter setting lever 51 when the free end thereof is in the shutter holding position shown in FIGS. 5 and 8. The leading curtain 15a and the trailing curtain 15b are allowed to travel when the free end of the shutter setting lever 51 is in the shutter release position shown in FIGS. 6 and 7 that is above the shutter holding position. The shutter setting lever 51 is biased toward the shutter release position by a setting lever restoring spring 55 (shown conceptually in FIGS. 5 through 8, 15 through 18, and 20 through 23). The shutter charge operation for the leading curtain 15a and the trailing curtain 15b of the shutter 15 is performed by a movement of the shutter setting lever 51 from the shutter release position to the shutter holding position. The leading curtain 15a and the trailing curtain 15b in a state of having been charged can be held (prevented from traveling) by a leading curtain holding magnet 52 and a trailing curtain holding magnet 53 (both shown in FIG. 2). The leading curtain holding magnet 52 is excited (turned ON) to produce a magnetic attractive force to hold the leading curtain 15a upon being energized, and subsequently, upon the energized state of the leading curtain holding magnet 52 being canceled, the leading curtain holding magnet 52 moves to a non-energized state (OFF state), thus causing the leading curtain 15a to travel. Likewise, the trailing curtain holding magnet 53 is excited (turned ON) to produce a magnetic attractive force to hold the trailing curtain 15b upon being energized, and subsequently, upon the energized state of the trailing curtain holding magnet 53 being canceled, the trailing curtain holding magnet 53 moves to a non-energized state (OFF state), thus causing the trailing curtain 15b to travel.

Figure 3:
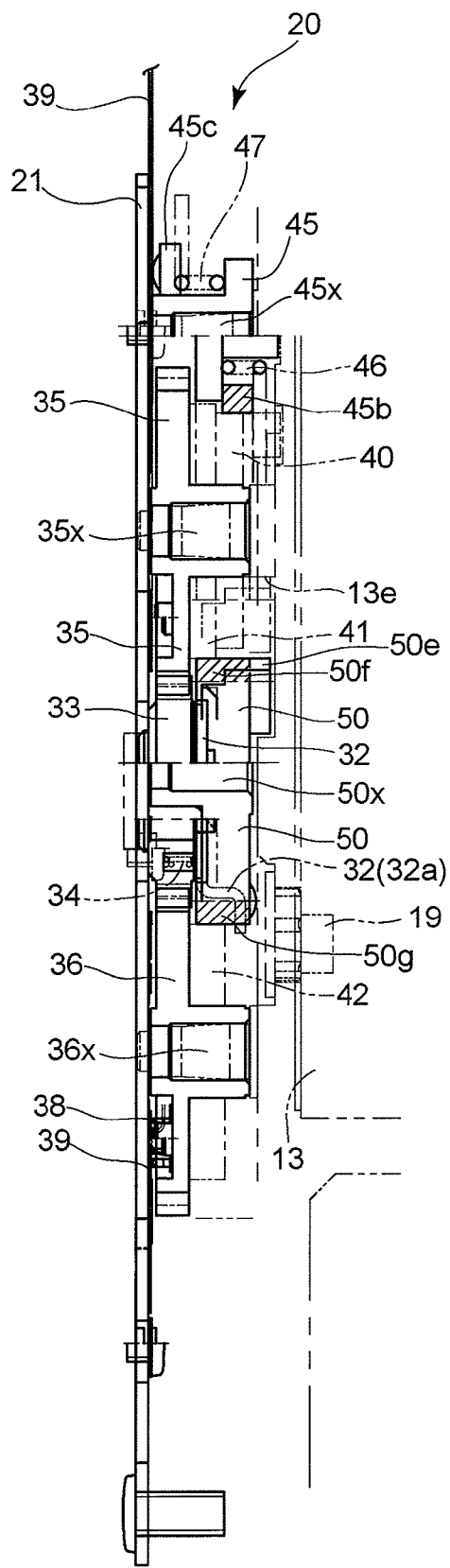
FIG. 3 is a front elevational view of a mirror/shutter drive mechanism installed on a side of a mirror box provided in the SLR camera, showing part of the mirror/shutter drive mechanism in cross section, viewed from front of the SLR camera.
Figure 4:
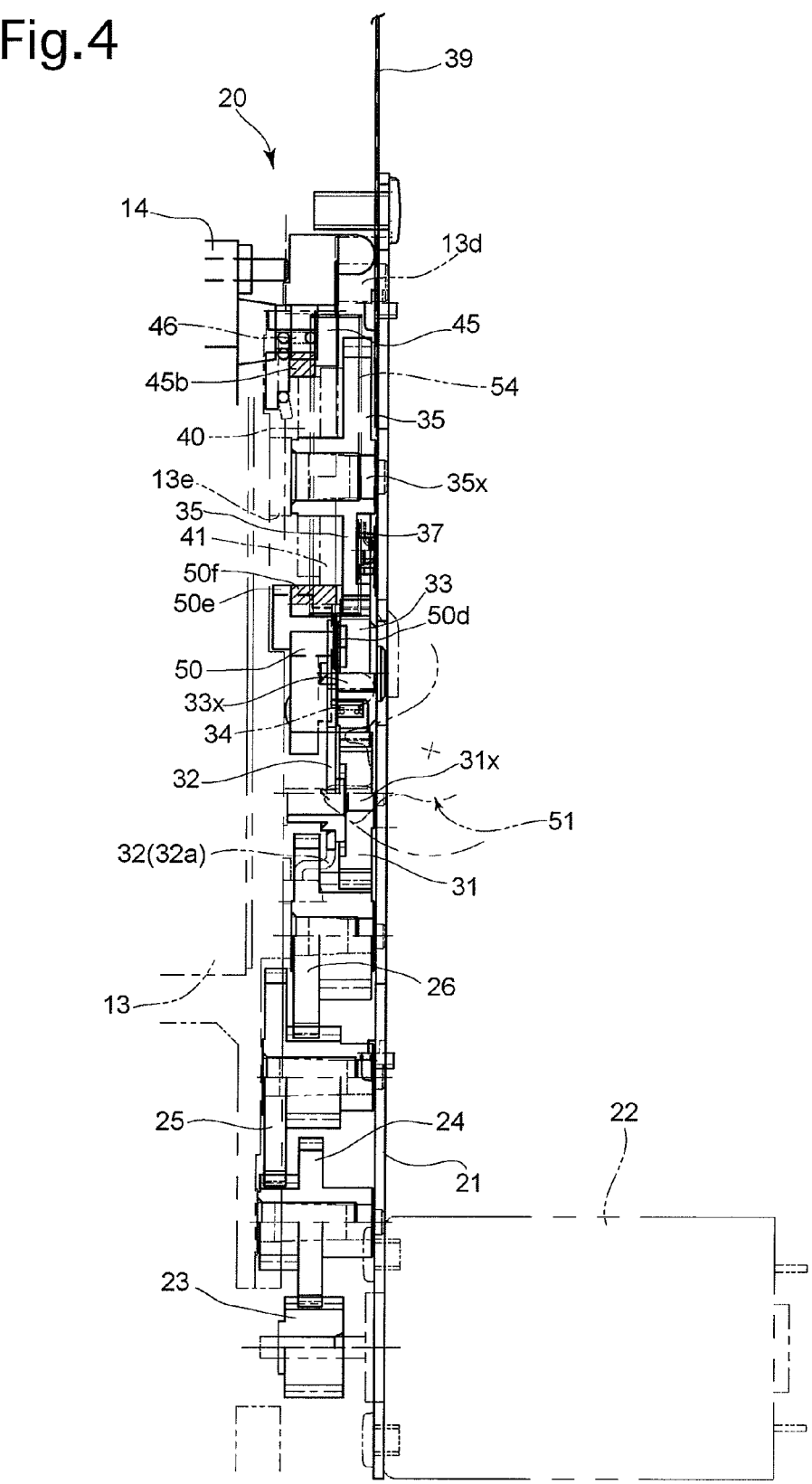
FIG. 4 is a rear elevational view of the mirror/shutter drive mechanism, showing part of the mirror/shutter drive mechanism in cross section, viewed from rear of the SLR camera.
Figure 9:
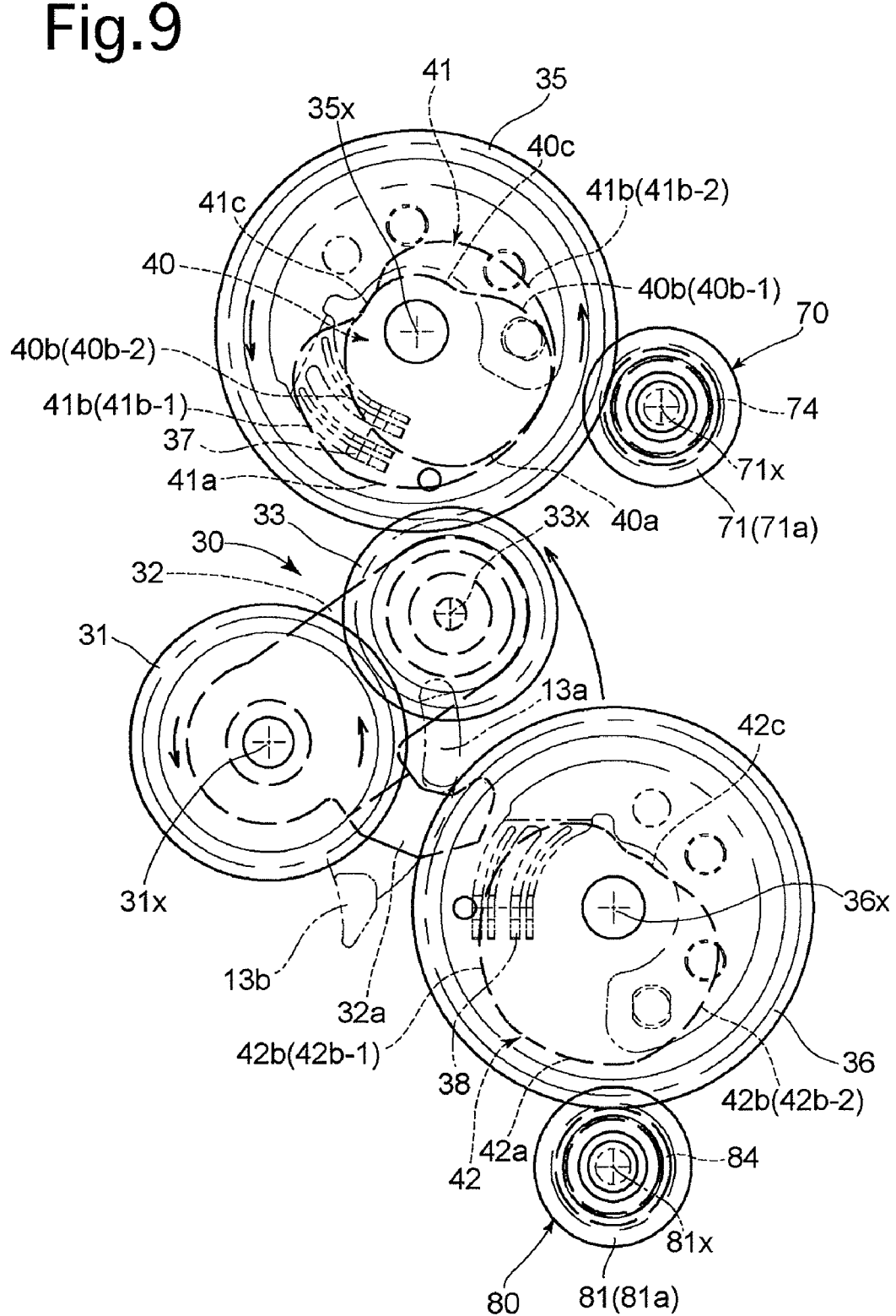
FIG. 9 is a side elevational view of a portion of the mirror/shutter drive mechanism in a state where a motor driving force is transmitted to the first cam-incorporated gear via the planetary gear mechanism, which serves as a component of the mirror/shutter drive mechanism.
Figure 10:
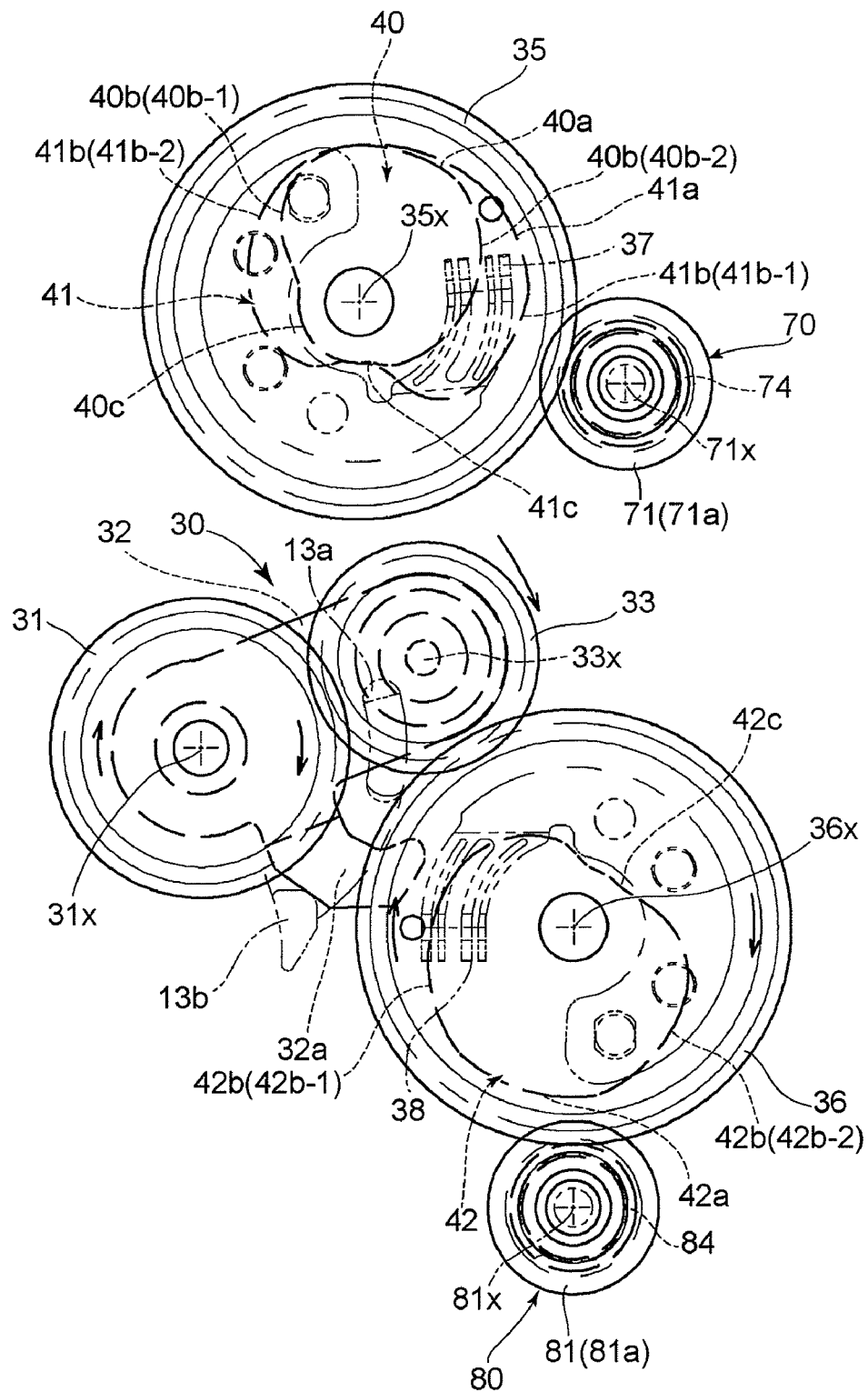
FIG. 10 is aside elevational view of the portion of the mirror/shutter drive mechanism shown in FIG. 9 in a state where a motor driving force is transmitted to the second cam-incorporated gear via the planetary gear mechanism.

The camera 10 is provided on a side of the mirror box 13 with a mirror/shutter drive mechanism (power transmission mechanism) 20. As shown in FIGS. 3 and 4, the camera 10 is provided therein with a cover plate (gear support member) 21 fixed at a position facing a side surface of the mirror box 13 (this position corresponds to a position in front of the paper plane in each of FIGS. 5 through 8) and is further provided therein with a drive motor (reversible motor/drive source) 22 which is supported by the cover plate 21 in the vicinity of the lower end thereof. A motor pinion 23 is fixed on the rotary output shaft of the drive motor 22. The mirror/shutter drive mechanism 20 is provided with a planetary gear mechanism 30, and rotation of the motor pinion 23 is transmitted to a sun gear 31 of the planetary gear mechanism 30 via a reduction gear train consisting of three reduction gears 24, 25 and 26. As shown in FIGS. 9 and 10, the planetary gear mechanism 30 is provided with a planetary gear arm 32 swingable about a rotational shaft 31x of the sun gear 31, and is provided with a planet gear 33 which is supported by the free end of the planetary gear arm 32 to be rotatable on a rotational shaft 33x extending parallel to the rotational shaft 31x of the sun gear 31. The planet gear 33 is in mesh with the sun gear 31, and friction (rotational resistance) of a predetermined magnitude is applied between the planet gear 33 and the planetary gear arm 32 by a planetary gear friction spring 34 (see FIGS. 3 and 4).

The planet gear 33 meshes selectively with a first cam-incorporated gear 35 and a second cam-incorporated gear 36 by a swing motion of the planetary gear arm 32. The planetary gear arm 32 is provided with a sub-arm 32a, and the limit of swing movement of the planetary gear arm 32 in a direction to engage with the first cam-incorporated gear 35 is determined by the engagement between the sub-arm 32a and a swing movement limit protrusion (swing movement limit portion) 13a formed on the mirror box 13. In addition, the limit of swing movement of the planetary gear arm 32 in a direction to engage with the second cam-incorporated gear 36 is determined by the engagement between the sub-arm 32a and a swing movement limit protrusion 13b formed on the mirror box 13.

The first cam-incorporated gear 35 and the second cam-incorporated gear 36 are supported by a side of the mirror box 13 and the cover plate 21 therebetween to be rotatable on a rotational shaft 35x and a rotational shaft 36x, respectively, each of which is parallel to the rotational shaft 33x of the planet gear 33. Each of the first cam-incorporated gear 35 and the second cam-incorporated gear 36 is provided on the outer peripheral surface thereof with a circumferential gear (gear teeth) engageable with the planet gear 33. The first cam-incorporated gear 35 and the second cam-incorporated gear 36 are substantially identical in diameter to each other. In addition, the first cam-incorporated gear 35 and the second cam-incorporated gear 36 are mutually identical in the number of gear teeth on the outer peripheral surface (i.e., reduction ratio is 1:1). The first cam-incorporated gear 35 and the second cam-incorporated gear 36 are provided on surfaces thereof facing the cover plate 21 with a code plate brush 37 and a code plate brush 38, respectively. A code plate 39 (see FIGS. 3 and 4), with which the code plate brushes 37 and 38 are in sliding contact, is supported by the cover plate 21. Due to conduction of electricity between each code plate brush 37 and 38 and the pattern of traces formed on the code plate 39, specific rotation positions of each cam-incorporated gear 35 and 36 are detected. Such detectable rotation positions of the cam-incorporated gears 35 and 36 will be discussed in detail later. Additionally, the first cam-incorporated gear 35 is provided, on a surface thereof opposite to the surface to which the code plate brush 37 is fixed, with a mirror control cam (surface cam/mirror-control surface cam) 40 and a first shutter control cam (surface cam/first shutter-control surface cam) 41. The second cam-incorporated gear 36 is provided, on a surface thereof opposite to the surface to which the code plate brush 38 is fixed, with a second shutter control cam (surface cam/second shutter-control surface cam) 42. The detailed shapes of the mirror control cam 40, the first shutter control cam 41 and the second shutter control cam 42 will be discussed later. All the rotational shafts of the above described gears ranging from the motor pinion 23 to the first and second cam-incorporated gears 35 and 36 are substantially parallel to the axis of the mirror sheet hinge 14x.

Figure 11:
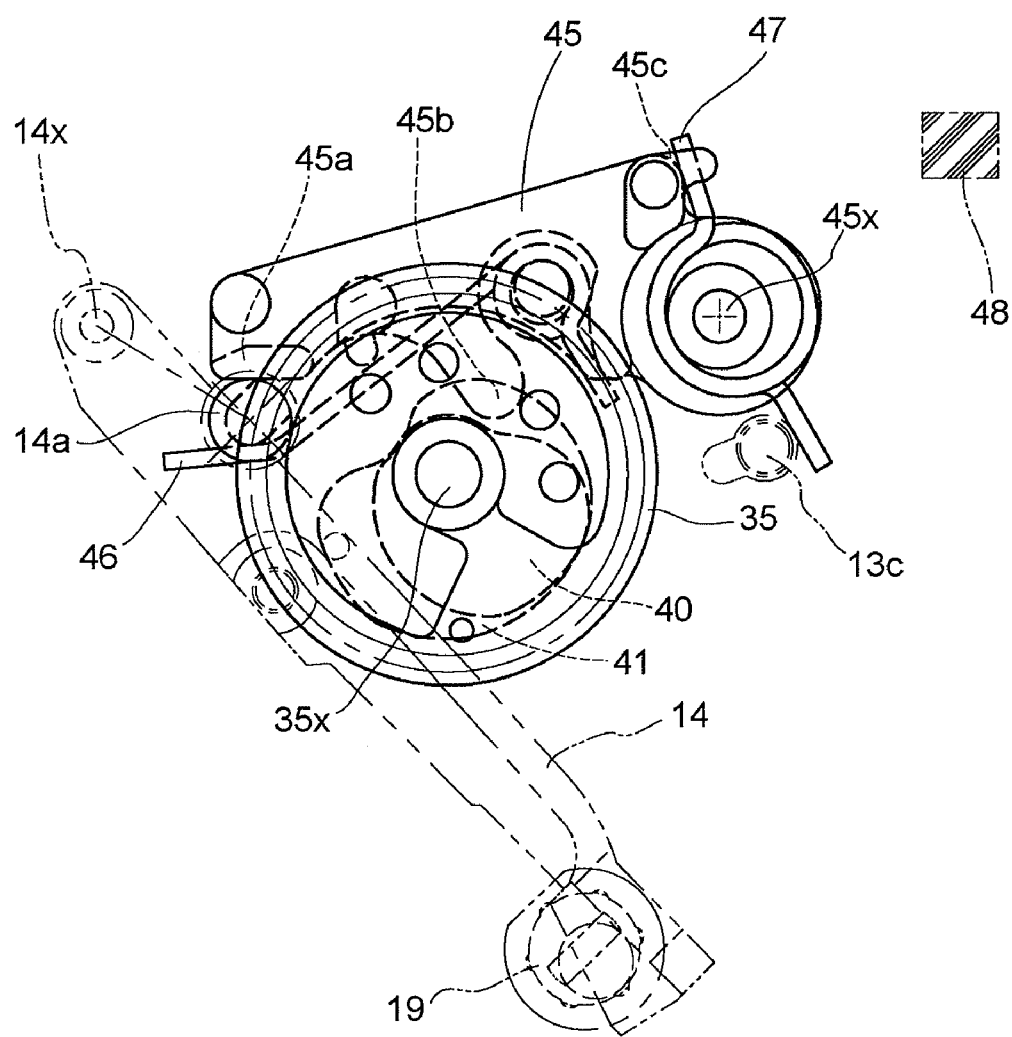
FIG. 11 a side elevational view of a portion of the mirror/shutter drive mechanism in a state where the mirror is held in the down position, in which the mirror is in contact with a limit pin, while a mirror drive lever is held in the mirror-down position.
Figure 15:
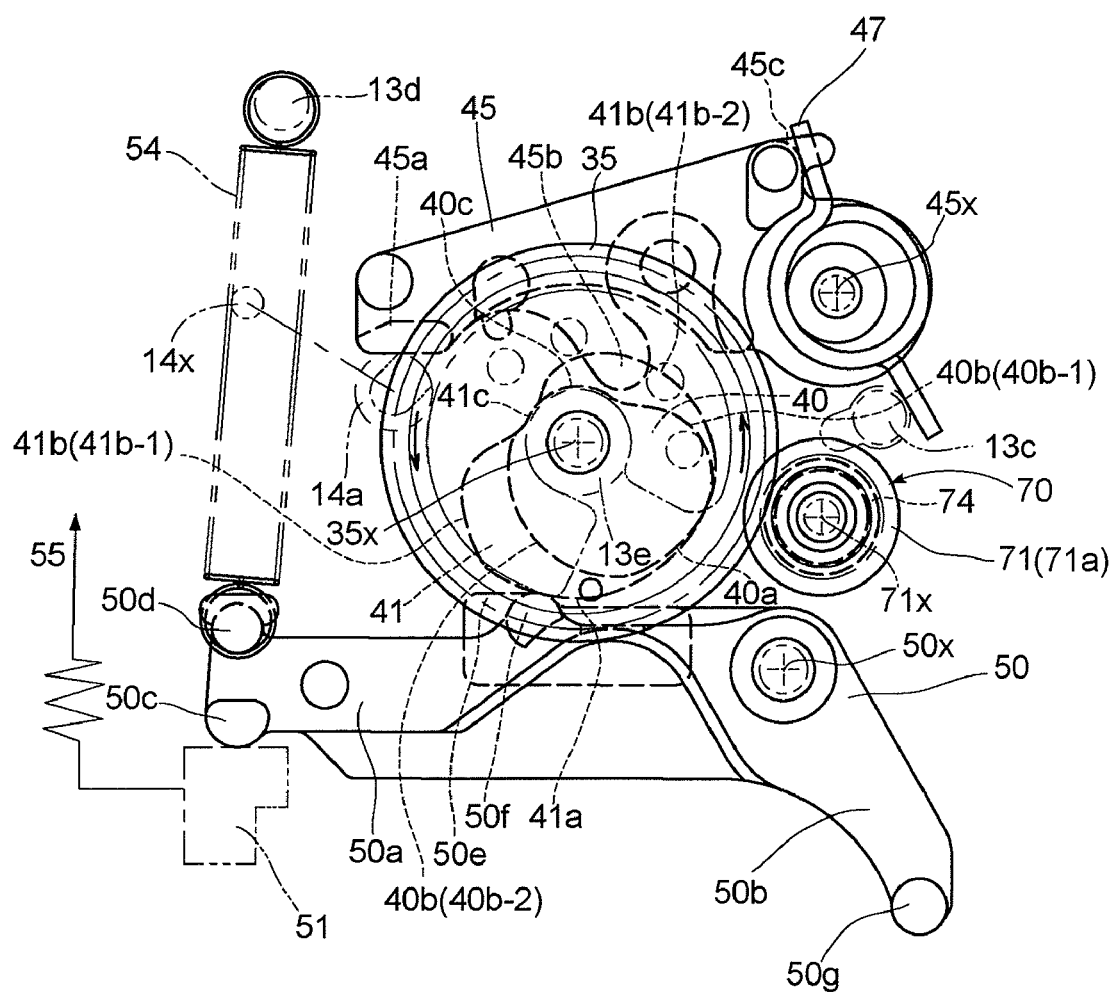
FIG. 15 is a side elevational view of the first cam-incorporated gear, the mirror drive lever, the shutter charge lever and associated elements, showing the relative positions between the first cam-incorporated gear, the mirror drive lever and the shutter charge lever when the first cam-incorporated gear is positioned at the origin position thereof shown in FIG. 5.

The mirror/shutter drive mechanism 20 is provided between a side of the mirror box 13 and the cover plate 21 with a mirror drive lever (driven member/swingable member) 45 which is supported therebetween to be swingable about a rotational shaft 45x substantially parallel to the axis of the mirror sheet hinge 14x. The mirror drive lever 45 is provided in the vicinity of the free end thereof (left end with respect to FIGS. 5 through 8) with a mirror retaining portion 45a. The mirror 14 is provided on the mirror sheet thereof with a mirror sheet boss 14a which is held between the mirror retaining portion 45a and a mirror-up spring 46. The mirror 14 is driven to swing between the aforementioned down position and the aforementioned upward retracted position in accordance with the swing operation of the mirror drive lever 45. Namely, the mirror drive lever 45 is driven to swing between a mirror-down position (first swing limit, shown in FIGS. 5 and 15), in which the mirror 14 is held in the down position within a photographing optical path, and a mirror-up position (second swing limit, shown in FIGS. 6 through 8 and 16) in which the mirror 14 is held in the upward retracted position. The mirror drive lever 45 is biased to rotate toward the mirror-down position by a mirror-down spring 47. The mirror-down spring 47 is made up of a torsion spring which includes a coiled portion positioned around the rotational shaft 45x of the mirror drive lever 45 and a pair of arms extending from the coiled portion. One of the pair of arms of the mirror-down spring 47 is hooked onto a spring hook 45c of the mirror drive lever 45 and the other arm is hooked onto a spring engaging projection 13c provided on a side of the mirror box 13. As shown in FIGS. 5 and 15, when the mirror drive lever 45 is in the mirror-down position, the mirror retaining portion 45a presses the mirror sheet boss 14a downward to hold the mirror 14 in the down position. As shown in FIGS. 3 and 11, a limit pin 19 which determines the down position of the mirror 14 is fixed to the mirror box 13, and the mirror drive lever 45 is held in the mirror down position by making the mirror retaining portion 45a in contact the mirror sheet boss 14a of the mirror 14, which is prevented from rotating by the limit pin 19. On the other hand, the mirror control cam 40 of the first cam-incorporated gear 35 can come in contact with a cam follower 45b formed on the mirror drive lever 45. Rotating the first cam-incorporated gear 35 to the position (mirror-up completion position) shown in FIGS. 6, 7, 8 and 16 causes the mirror control cam 40 to press the cam follower 45b upward, thus making it possible to hold the mirror drive lever 45 in the mirror-up position against the biasing force of the mirror-down spring 47. When the mirror drive lever 45 is in the mirror-up position, the mirror-up spring 46 lifts the mirror sheet boss 14a to hold the mirror 14 in the upward retracted position. At this time, the mirror-up spring 46 is slightly bent to thereby absorb any error in the amount of rotation of the mirror drive lever 45, which makes it possible to hold the mirror 14 in the upward retracted position reliably. In addition, the mirror box 13 is provided therein with a shock absorber (mirror cushion) 48 against to which the mirror 14 in the vicinity of the front end (free end) thereof abuts upon the mirror 14 being retracted to the upward retracted position.

The mirror/shutter drive mechanism 20 is also provided between a side of the mirror box 13 and the cover plate 21 with a shutter charge lever (driven member/swingable member) 50 which is supported therebetween to be swingable about a rotational shaft 50x substantially parallel to the axis of the mirror sheet hinge 14x. The shutter charge lever 50 is provided with a first arm 50a and a second arm 50b which extend in different directions with the rotational shaft 50x as a center. The shutter charge lever 50 is provided at a free end of the first arm 50a with an end contacting portion 50c which can come into contact with the free end of the shutter setting lever 51. The shutter charge lever 50 is swingable between two positions: a charge position (second swing limit, shown in FIGS. 5, 8, 15 and 18) to depress the shutter setting lever 51 to a shutter holding position via the end contacting portion 50c, and a charge release position (shown in FIGS. 6, 7, 16 and 17) to be disengaged from the shutter setting lever 51 to thereby allow the shutter setting lever 51 to move to the shutter release position (first swing limit, shown in FIGS. 6, 7, 16 and 17). The shutter charge lever 50 is biased to rotate toward the charge release position by a charge lever restoring spring 54. The charge lever restoring spring 54 is an extension spring, one and the other ends of which are hooked onto a spring engaging projection 50d formed on the first arm 50a and a spring engaging projection 13d formed on a side of the mirror box 13, respectively. The limit of swing movement of the shutter charge lever 50 in the biasing direction of the charge lever restoring spring 54 (i.e., the charge release position of the shutter charge lever 50) is determined by making a stopper portion 50e (see FIGS. 17 and 18) formed on the first arm 50a come in contact with a swing limit protrusion 13e (see FIGS. 3 through 8, 15 through 19). In addition, the first arm 50a is provided thereon with a first cam follower 50f and the second arm 50b is provided thereon with a second cam follower 50g. The first cam follower 50f and the second cam follower 50g are substantially the same distance from the rotational shaft 50x. The first shutter control cam 41 of the first cam-incorporated gear 35 can come in contact with the first cam follower 50f and the second shutter control cam 42 of the second cam-incorporated gear 36 can come in contact with the second cam follower 50g. When the first cam-incorporated gear 35 is at the position (origin position) shown in FIGS. 5 and 15, the shutter charge lever 50 can be held in the charge position against the biasing force of the charge lever restoring spring 54 by depressing the first cam follower 50f via the first shutter control cam 41. Likewise, also by rotating the second cam-incorporated gear 36 to the position (shutter charge completion position) shown in FIGS. 8 and 18, the shutter charge lever 50 can be held in the charge position against the biasing force of the charge lever restoring spring 54 by pushing up the second cam follower 50g via the second shutter control cam 42. Hence, the shutter charge lever 50 is shared between the first and second cam-incorporated gears 35 and 36 in the above-described manner.

Figure 19:
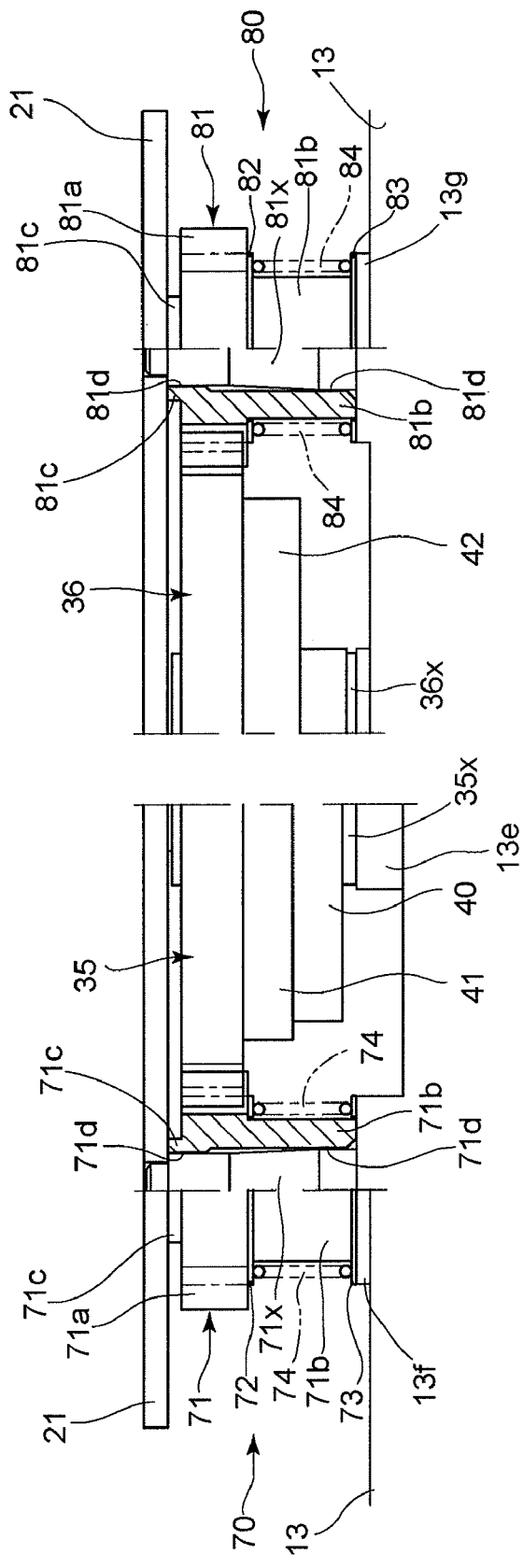
FIG. 19 is a cross sectional view of a first frictional gear mechanism and a second frictional gear mechanism which are incorporated in the power transmission mechanism, showing the detailed structures thereof.

The mirror/shutter drive mechanism 20 is further provided with a first frictional gear mechanism 70 and a second frictional gear mechanism 80. The first frictional gear mechanism 70 serves as a damping (load-imposing) mechanism for imposing load on the first cam-incorporated gear 35 and the second frictional gear mechanism 80 serves as a damping (load-imposing) mechanism for imposing load on the second cam-incorporated gear 36. As shown in FIG. 19, the first frictional gear mechanism 70 is provided with a first friction gear 71 rotatable on a rotational shaft 71x substantially parallel to the rotational shaft 35x of the first cam-incorporated gear 35 and the rotational shaft 36x of the second cam-incorporated gear 36. The first friction gear 71 is provided with a gear portion 71a which is engaged with the first cam-incorporated gear 35 and further provided on respective sides of the gear portion 71a with a first cylindrical sleeve 71b and a second cylindrical sleeve 71c each of which is smaller in diameter than the gear portion 71a and coaxial with the gear portion 71a. A shaft insertion hole 71d is formed through the first friction gear 71, and a rotational shaft 71x is inserted into the shaft insertion hole 71d through the first cylindrical sleeve 71b and the second cylindrical sleeve 71c. The first friction gear 71 is positioned so that the outer end (lower end with respect to FIG. 19) of the first cylindrical sleeve 71b faces an abutment portion 13f of the mirror box 13 and that the outer end (upper end with respect to FIG. 19) of the second cylindrical sleeve 71c faces the cover plate 21. The rotational shaft 71x projects toward the cover plate 21 from the abutment portion 13f. The first friction gear 71 is held between the abutment portion 13f and the cover plate 21 to thereby be prevented from moving in the direction of the rotational shaft 71x. The first frictional gear mechanism 70 is provided on the first cylindrical sleeve 71b with two thin washers 72 and 73, and provided with a friction spring (first friction spring) 74 on the first cylindrical sleeve 71b between the two washers 72 and 73. The friction spring 74 is a compression coil spring which biases the two washers 72 and 73 in opposite directions away from each other to press the two washers 72 and 73 against the gear portion 71a and the abutting portion 13f, respectively. Due to this pressure force of the friction spring 74, a rotational load (friction) acts on the first friction gear 71 during rotation thereof.

The second frictional gear mechanism 80 is similar in structure to the first frictional gear mechanism 70. More specifically, the second frictional gear mechanism 80 is provided with a second friction gear 81 rotatable on a rotational shaft 81x. The second friction gear 81 is provided with a gear portion 81a which is engaged with the second cam-incorporated gear 36 and further provided on respective sides of the gear portion 81a with a first cylindrical sleeve 81b and a second cylindrical sleeve 81c, each of which is smaller in diameter than the gear portion 81a and coaxial with the gear portion 81a. A shaft insertion hole 81d is formed through the second friction gear 81, and the rotational shaft 81x is inserted into the shaft insertion hole 81d through the first cylindrical sleeve 81b and the second cylindrical sleeve 81c. The rotational shaft 81x projects in a direction substantially parallel to the rotational shaft 71x from an abutment portion 13g formed on a side surface of the mirror box 13. The outer ends of the first cylindrical sleeve 81b and the second cylindrical sleeve 81c are held between the abutment portion 13g and the cover plate 21 to thereby prevent the second friction gear 81 from moving in the direction of the rotational shaft 81x. The second frictional gear mechanism 80 is provided on the first cylindrical sleeve 81b with two thin washers 82 and 83, and provided on the first cylindrical sleeve 81b between the two washers 82 and 83, with a friction spring (second friction spring) 84. The friction spring 84 is a compression coil spring which biases the two washers 82 and 83 in opposite directions away from each other to press the two washers 82 and 83 against the gear portion 81a and the abutting portion 13g, respectively. Due to this pressure force of the friction spring 84, a rotational load (friction) acts on the second friction gear 81 during rotation thereof.

In addition to the mirror/shutter drive mechanism 20, the camera body 10 is provided with a diaphragm control mechanism 27 (conceptually shown in FIG. 1) for controlling driving of an adjustable diaphragm 12b provided in the lens barrel 12. The diaphragm control mechanism 27 is driven by a drive source different from the drive motor 22 of the mirror/shutter drive mechanism 20. During a live view operation (real-time preview operation) that will be discussed later, the size of the aperture opening (f-number) of the adjustable diaphragm 12b can be adjusted according to brightness information of the object image obtained via the image sensor 16.

Figure 2:
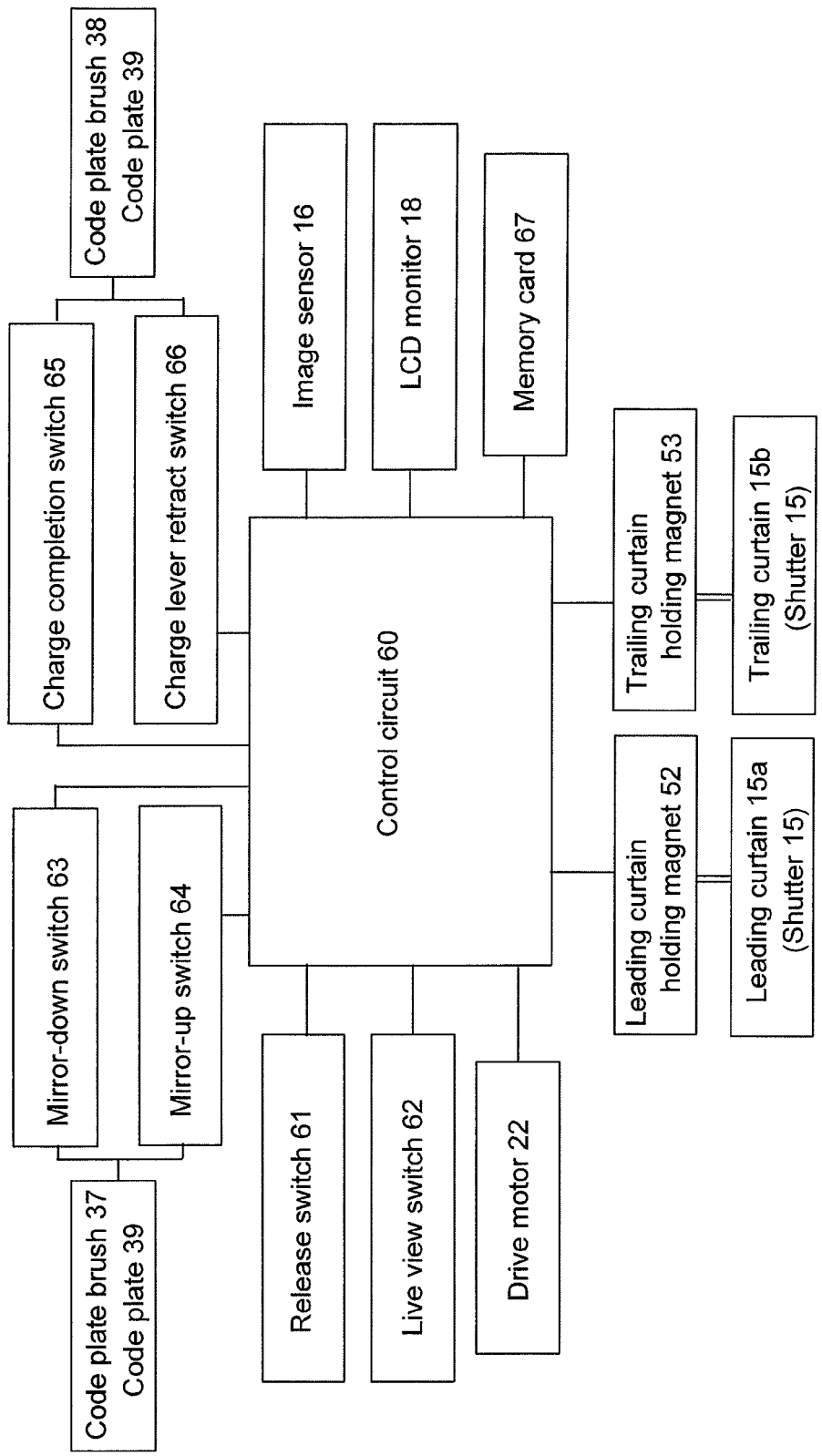
FIG. 2 is a block diagram of main elements of a control system of the SLR camera.

FIG. 2 is a block diagram showing main elements of a control system of the camera 10. Although the camera 10 is equipped with an exposure control system, which is associated with settings of the f-number that are determined by the diaphragm control mechanism 27 and settings of the shutter speed, and an autofocus system that operates based on object distance information, such systems are omitted from the block diagram in FIG. 2 for the sake of brevity. As shown in FIG. 2, the control system is provided with a control circuit 60, and is provided with a release switch 61, a live view switch 62, a mirror-down switch 63, a mirror-up switch 64, a charge completion switch 65 and a charge lever retract switch 66 that are all connected to the control circuit 60. In response to signals input from the release switch 61, the live view switch 62, the mirror-down switch 63, the mirror-up switch 64, the charge completion switch 65 and the charge lever retract switch 66, the control circuit 60 controls the operations of the drive motor 22, the leading-curtain holding magnet 52 and the trailing-curtain holding magnet 53 in accordance with programs stored in internal memory. The release switch 61 can be turned ON by depressing a release button (not shown) provided on an outer surface of the camera body 11. The live view switch 62 can be turned ON and OFF by depressing a live view button (not shown) provided on the outer surface of the camera body 11.

The ON/OFF states of the mirror-down switch 63 and the mirror-up switch 64 are input to the control circuit 60 as rotational position information of the first cam-incorporated gear 35 that is detected by the code plate brush 37 and the code plate 39. More specifically, the mirror-down switch 63 is turned ON upon the first cam-incorporated gear 35 rotating to the rotational position (origin position) shown in FIGS. 5 and 15, and the mirror-up switch 64 is turned ON upon the first cam-incorporated gear 35 rotating to the rotational position (mirror-up completion position) shown in FIGS. 6 and 16. The ON/OFF states of the charge completion switch 65 and the charge lever retract switch 66 are input to the control circuit 60 as rotational position information of the second cam-incorporated gear 36 that is detected by the code plate brush 38 and the code plate 39. More specifically, the charge completion switch 65 is turned ON upon the second cam-incorporated gear 36 rotating to the rotational position (shutter charge completion position) shown in FIGS. 8 and 18, and the charge lever retract switch 66 is turned ON upon the second cam-incorporated gear 36 rotating to the rotational position (origin position) shown in FIGS. 7 and 17.

The control circuit 60 includes an image processing circuit. This image processing circuit processes object image formed on the light receiving surface of the image sensor 16 to produce electronic image data, stores this produced image data in a recording medium such as a memory card 67, and makes the LCD monitor 18 display the electronic image.

Operations of the camera 10 that has the above described structure will be discussed hereinafter. The rotational directions of the cam-incorporated gears 35, 36 which will be referred in the following descriptions about operations of the camera 10 are based on the drawings in FIGS. 5 through 11, 15 through 18, and 20 through 23.

FIGS. 5 and 15 show an initial state of the mirror/shutter drive mechanism 20 in normal exposure mode (normal view mode/optical view mode). In this initial state, the mirror drive lever 45 (the cam follower 45b) has not yet been lifted by the mirror control cam 40 of the first cam-incorporated gear 35; the mirror drive lever 45 is held in the mirror-down position by the biasing force of the mirror-down spring 47, and accordingly, the mirror 14 is held in the down position. In addition, the first cam follower 50f has been depressed by the first shutter control cam 41 of the first cam-incorporated gear 35, so that the shutter charge lever 50 is held in the charge position against the biasing force of the charge lever restoring spring 54. The shutter setting lever 51 has been depressed by the end contacting portion 50c of the shutter charge lever 50 to be held in the shutter holding position. On the other hand, the second shutter control cam 42 of the second cam-incorporated gear 36 is spaced away from the second cam follower 50g and thus not involved in the position control for the shutter charge lever 50. At this time, the shutter 15 has been already charged, and the presence of the shutter setting lever 51 in the shutter holding position mechanically prevents the leading curtain 15a and the trailing curtain 15b from traveling. Additionally, each of the leading curtain holding magnet 52 and the trailing curtain holding magnet 53 is in the OFF state. The rotational positions of the first cam-incorporated gear 35 and the second cam-incorporated gear 36 when the mirror/shutter drive mechanism 20 is in the above described initial state are designated as the origin positions of the first cam-incorporated gear 35 and the second cam-incorporated gear 36, respectively. In addition, in the initial state of the mirror/shutter drive mechanism 20, the planetary gear mechanism 30 is in a state where the planet gear 33 is in mesh with the first cam-incorporated gear 35 (see FIG. 9).

Figure 12:
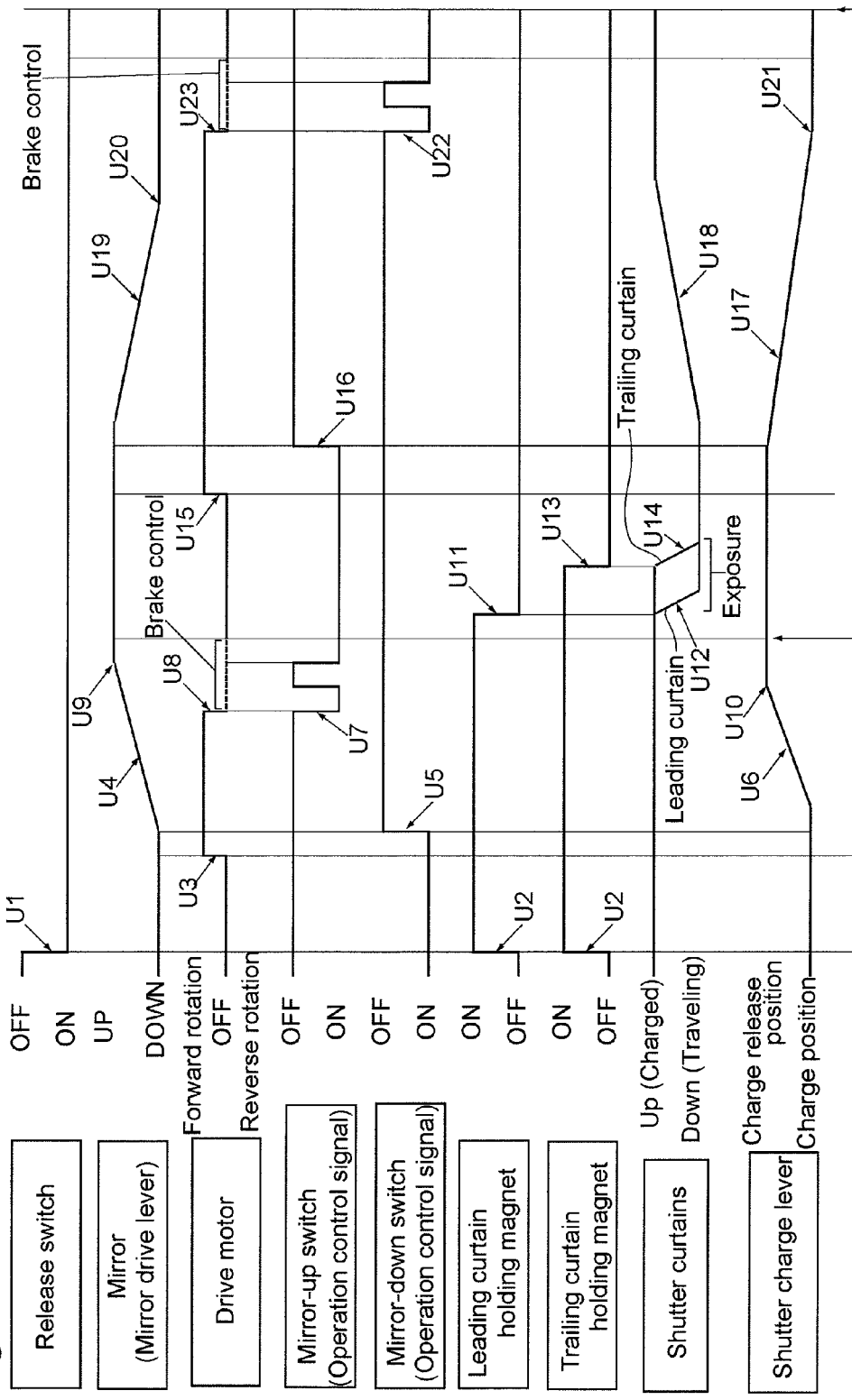
FIG. 12 is a timing chart showing a normal photography operational-sequence in normal exposure mode (normal view mode/optical view mode)

In this initial state, upon the release switch 61 being turned ON, a photographing operation in the normal exposure mode that is shown in the timing chart shown in FIG. 12 is performed. In the normal exposure mode, the driving of the drive motor 22 is controlled so that the motor pinion 23 rotates counterclockwise with respect to FIG. 5. This direction of rotation of the drive motor 22 will be hereinafter referred to as the forward rotational direction. In addition, the driving direction of the drive motor 22 to rotate the motor pinion 23 in the reverse direction, i.e., clockwise with respect to FIG. 5 will be hereinafter referred to as the reverse rotational direction. Upon the release switch 61 being turned ON (see U1 shown in FIG. 12; refer to FIG. 12 when a numeral with the prefix "U" is found in the following descriptions), firstly the leading curtain holding magnet 52 and the trailing curtain holding magnet 53 are energized to electromagnetically hold the leading curtain 15a and the trailing curtain 15b (see U2). At this point, exposure control (photometering operation and selection of an f-number and a shutter speed), various calculations for AF control and communications with the lens barrel 12 are performed; detailed descriptions thereof will be omitted herein.

Subsequently, the drive motor 22 is driven forward (see U3) to rotate the sun gear 31 counterclockwise with respect to FIG. 5 via the motor pinion 23 and the reduction gears 24, and 26. Although this rotational direction of the sun gear 31 is a rotational direction to bring the planetary gear arm (swing arm) 32 and the planet gear 33 close to the first cam-incorporated gear 35, the planet gear 33 is already engaged with the first cam-incorporated gear 35, and the planetary gear arm 32 is prevented from rotating in the same rotational direction by the engagement between the sub-arm 32a and the swing movement limit protrusion 13a. Therefore, the counterclockwise direction of the sun gear 31 causes the planet gear 33 to rotate clockwise with respect to FIG. 5 without changing the position of the axis thereof, thus causing the first cam-incorporated gear 35 to rotate counterclockwise with respect to FIG. 5. A predetermined amount of rotation of the first cam-incorporated gear 35 from the origin position causes the mirror control cam 40 to come into contact with the cam follower 45b and press the cam follower 45b to rotate the mirror drive lever 45 toward the mirror-up position. Thereupon, the mirror sheet boss 14a is pushed up by the mirror-up spring 46, which causes the mirror 14 to rotate toward the upper retracted position from the down position (see U4). The predetermined amount of rotation of the first cam-incorporated gear 35 from the origin position causes the contact position of the code plate brush 37 with the code plate 39 to vary to thereby turn OFF the mirror down switch 63 (see U5). Additionally, during the counterclockwise rotation of the first cam-incorporated gear 35 from the origin position, the first shutter control cam 41 gradually reduces the amount of depression against the first cam follower 50f, and the shutter charge lever 50 is rotated from the charge position toward the charge release position by the biasing force of the charge lever restoring spring 54 (see U6). Following this rotation of the shutter charge lever 50, the shutter setting lever 51 is also rotated toward the shutter release position from the shutter holding position by the biasing force of the setting lever restoring spring 55.

Figure 6:
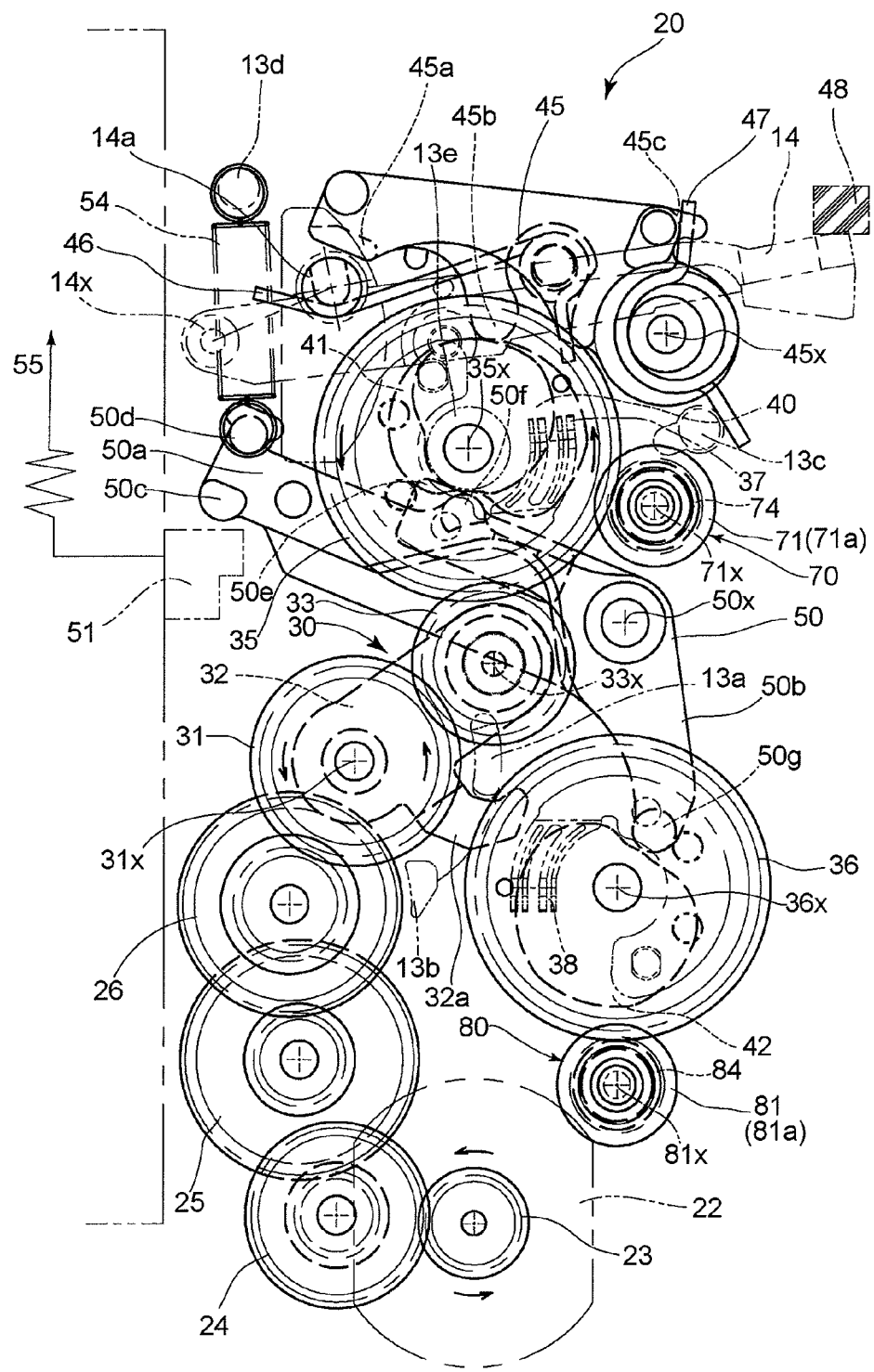
FIG. 6 is a side elevational view of the mirror/shutter drive mechanism in an exposure-possible state in which the mirror is held in the retracted position and a shutter charge lever is held in the charge release position.
Figure 16:
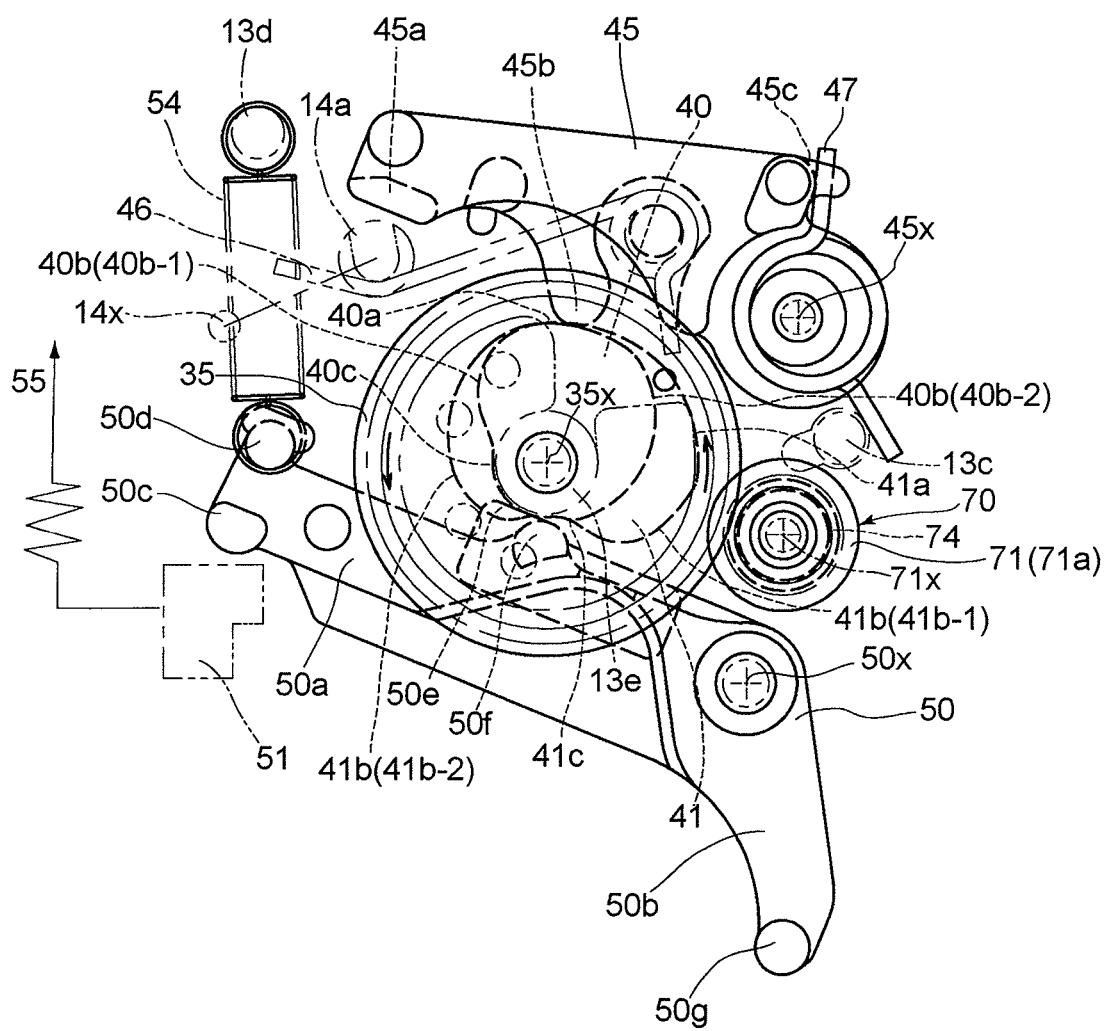
FIG. 16 is a side elevational view of the first cam-incorporated gear, the mirror drive lever, the shutter charge lever and associated elements, showing the relative positions between the first cam-incorporated gear, the mirror drive lever and the shutter charge lever when the first cam-incorporated gear is positioned at the origin position thereof shown in FIG. 6.

Upon the first cam-incorporated gear 35 being rotated to the mirror-up completion position shown in FIGS. 6 and 16, the mirror-up switch 64 is turned ON (see U7). Upon the ON signal being input to the control circuit 60 from the mirror-up switch 64, the forward rotation of the drive motor 22 is stopped (see U8). Thereupon, the mirror-up operation (upward rotations of the mirror 14 and the mirror drive lever 45) and the retracting operation (upward rotation) of the shutter charge lever 50 are stopped, and the mirror 14 and the mirror drive lever 45 are held in the upward retracted position and the mirror-up position, respectively (see U9), and the shutter charge lever 50 is held in the charge release position (see U10). At this time, the mirror/shutter drive mechanism 20 is in an exposure possible state shown in FIGS. 6 and 16. Subsequently, after the drive motor 22 is stopped, the passage of current through the leading curtain holding magnet 52 is stopped (see U11), so that the leading curtain 15a of the shutter 15 the mechanical lock of which has been already released travels (see U12). Subsequently, the lapse of time for opening-shutting the shutter 15 based on the set shutter speed is checked, the passage of current through the trailing curtain holding magnet 53 is stopped (see U13) upon a lapse of a predetermined period of time from the commencement of travel of the leading curtain 15a, and thereupon the trailing curtain 15b of the shutter 15 commences traveling (see U14). Due to such a difference in commencement of travel between the leading curtain 15a and the trailing curtain 15b, object light is incident on the light receiving surface of the image sensor 16, and thereupon an exposure operation is performed.

Upon completion of this exposure operation, the drive motor 22 is driven forward (see U15), the restoring operation of the mirror 14 and the shutter charge operation are performed. First, the mirror-up switch 64 is turned OFF by a rotation of the first cam-incorporated gear 35 from the mirror-up completion position shown in FIGS. 6 and 16 (see U16). Additionally, the first shutter control cam 41 depresses the first cam follower 50f as the first cam-incorporated gear 35 rotates, which causes the shutter charge lever 50 to rotate toward the charge position from the charge release position against the biasing forces of the charge lever restoring spring 54 and the setting lever restoring spring 55 (see U17). This rotation of the shutter charge lever 50 causes the shutter setting lever 51 to be depressed, thus causing the leading curtain 15a and the trailing curtain 15b of the shutter 15 to be charged (see U18). In addition, as the first cam-incorporated gear 35 rotates, the amount of lifting of the cam follower 45b by the mirror control cam 40 is gradually reduced, so that the mirror drive lever 45 is rotated toward the mirror-down position from the mirror-up position by the biasing force of the mirror-down spring 47. Due to this rotation of the mirror drive lever 45, the mirror retaining portion 45a depresses the mirror sheet boss 14a, thus causing the mirror 14 to rotate toward the down position from the upward retracted position (see U19). At the time the first cam-incorporated gear 35 rotates by one revolution to return to the origin position, the rotation of the mirror 14 to the down position (the rotation of the mirror drive lever 45 to the mirror-down position) and the rotation of the shutter charge lever 50 to the charge position have been completed (see U20 and U21). Upon detection of a change in the ON/OFF state of the mirror-down switch 63 from an OFF state to an ON state immediately after the first cam-incorporated gear 35 reaches the origin position (see U22), the forward driving of the drive motor 22 is stopped (see U23), so that the mirror/shutter drive mechanism 20 returns to the initial position shown in FIGS. 5 and 15. Namely, in a single photographing operation (sequence of processes for taking a picture) in normal exposure mode, the first cam-incorporated gear 35 is rotated by one revolution and operations associated with the mirror 14 (the mirror drive lever 45) and the shutter 15 (the shutter charge lever 50) are controlled.

Figure 13:
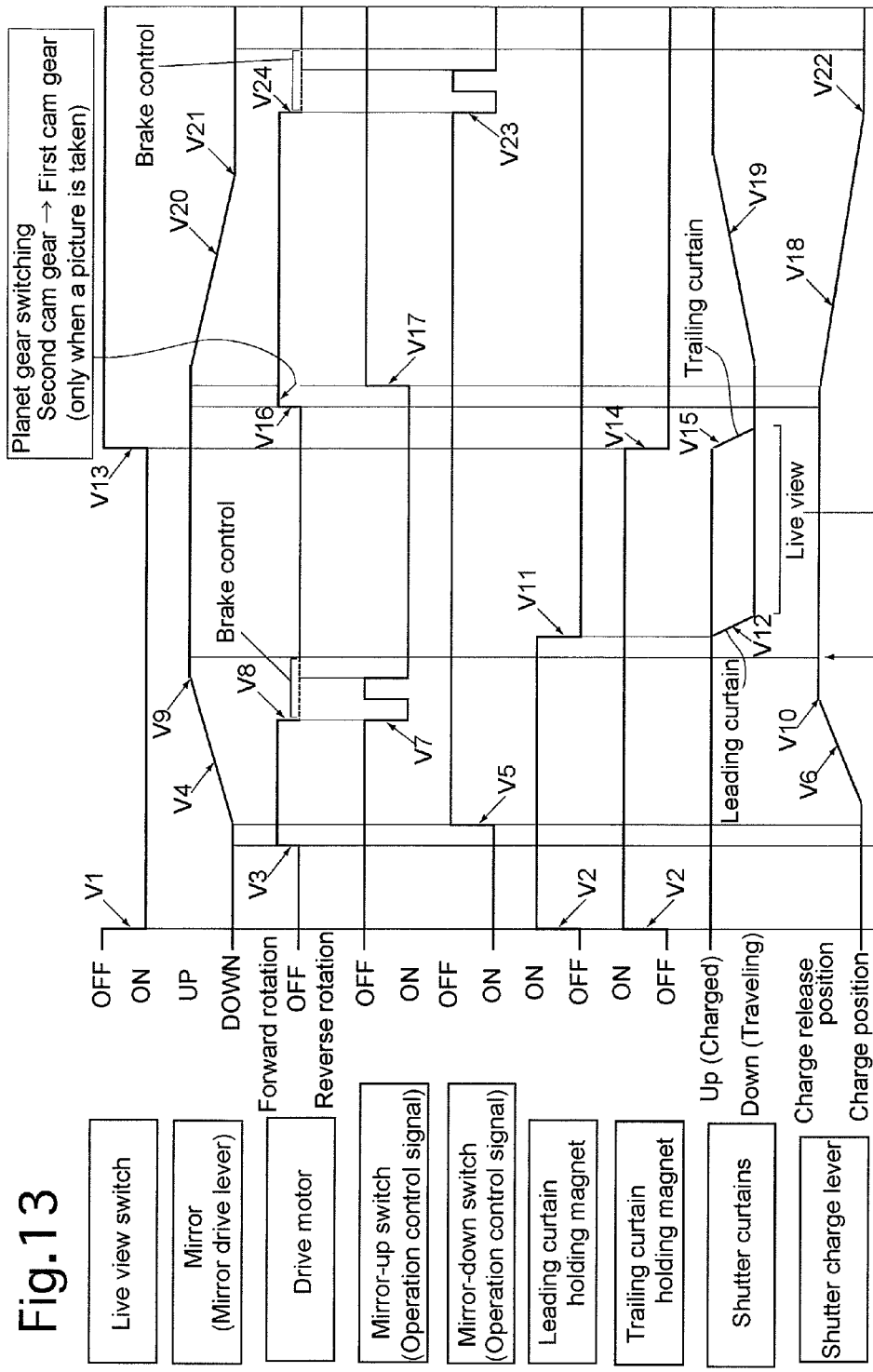
FIG. 13 is a timing chart showing an operational sequence of the live view mode.

In the initial state of the mirror/shutter drive mechanism 20 that is shown in FIGS. 5 and 15, upon the live view switch 62 being turned ON (see V1 shown in FIG. 13; refer to FIG. 13 when a numeral with the prefix "V" is found in the following descriptions), the camera 10 enters live view mode (live-view exposure mode) shown in the timing chart in FIG. 13. In the live view mode, the camera 10 operates in the same manner as in normal exposure mode until entering the exposure possible state shown in FIGS. 6 and 16. Namely, the controls and operations at V2 through V10 shown in FIG. 13 are identical to the above described controls and operations at U2 through U10 shown in FIG. 12; the forward driving of the drive motor 22 (see V3) causes the first cam-incorporated gear 35 to rotate from the origin position to the mirror-up completion position, and during this rotation of the first cam-incorporated gear 35 the mirror-up operation (see V4 and V9) and the retracting operation of the shutter charge lever 50 (see V6 and V10) are performed. Upon the first cam-incorporated gear 35 reaching the mirror-up completion position shown in FIGS. 6 and 16, the passage of current through the leading curtain holding magnet 52 is cut off (stopped) (see V11), which causes the leading curtain 15a of the shutter 15 to travel (V12). Subsequently, unlike in the case of normal exposure mode, the trailing curtain 15b does not travel following the leading curtain 15a, so that the shutter 15 is held open. Therefore, rays of light entering through the photographic lens 12a continue to be incident on the light receiving surface of the image sensor 16, and an electronic object image thus captured by the image sensor 16 is indicated in real-time on the LCD monitor 18 via image processing. On the other hand, since the mirror 14 is in the upward retracted position, the object image cannot be seen through the viewfinder 17.

At this stage, turning off the live view switch 62 (see V13) de-energizes the trailing curtain holding magnet 53 (see V14) and thereupon the trailing curtain commences to travel (see V15). Subsequently, the drive motor 22 is driven forward (see V16), and thereafter, operations for making the mirror/shutter drive mechanism 20 return to the initial position that are similar to the above described controls and operations at U16 through U23 shown in FIG. 12 are performed (see V17 through V24). Namely, the first cam-incorporated gear 35 rotates from the mirror-up completion position shown in FIGS. 6 and 16 to the origin position shown in FIGS. 5 and 15, and during this rotation the mirror-down operation (see V20 and V21) and the shutter charge operation (V18, V19 and V22) are performed.

Figure 7:
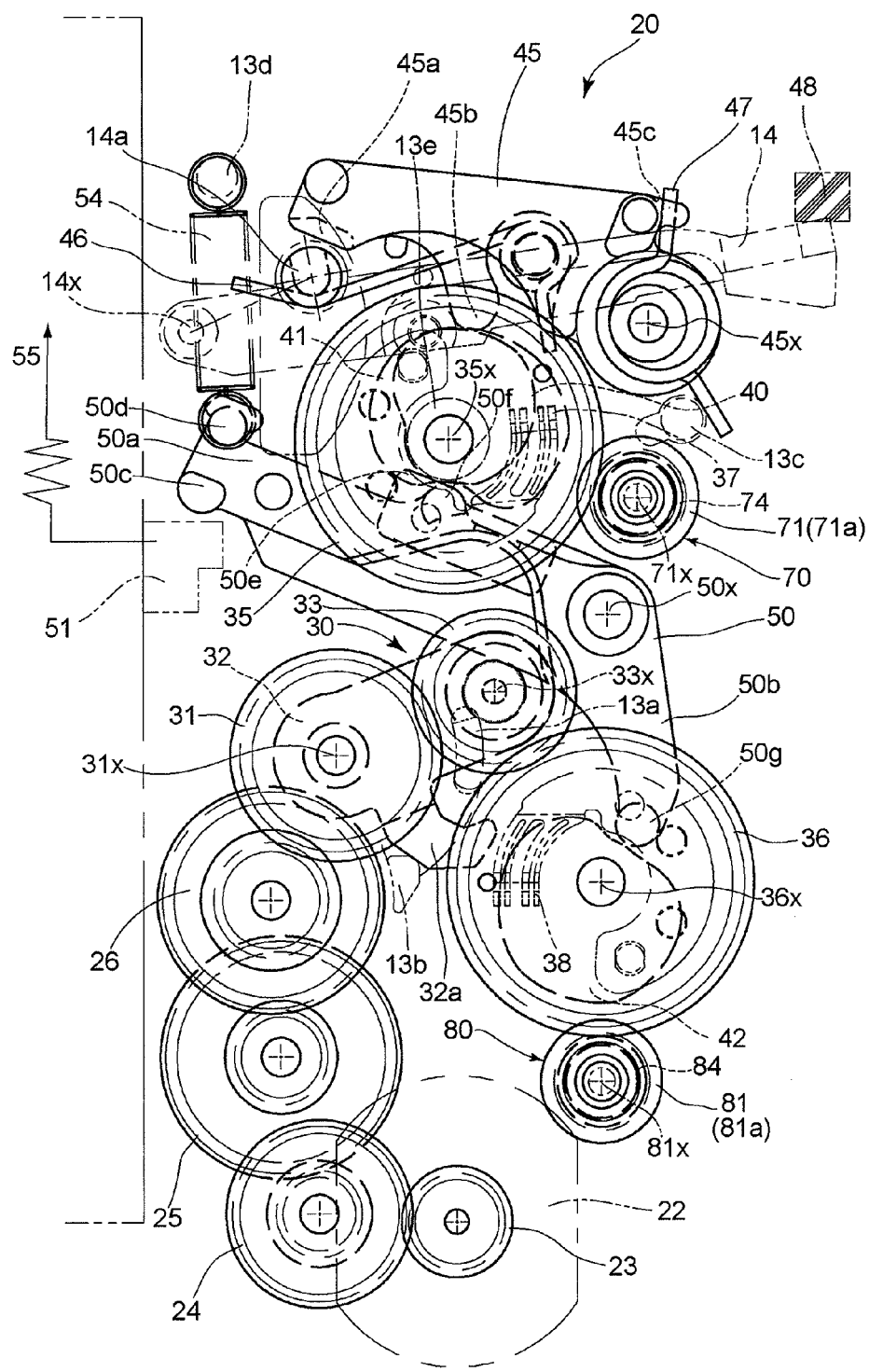
FIG. 7 is a side elevational view of the mirror/shutter drive mechanism in a state where a driving force has become transmittable to the second cam-incorporated gear via a planetary gear mechanism by a reverse drive of a motor from the exposure possible state shown in FIG. 6 when a photographing operation is performed in the live view mode.
Figure 14:
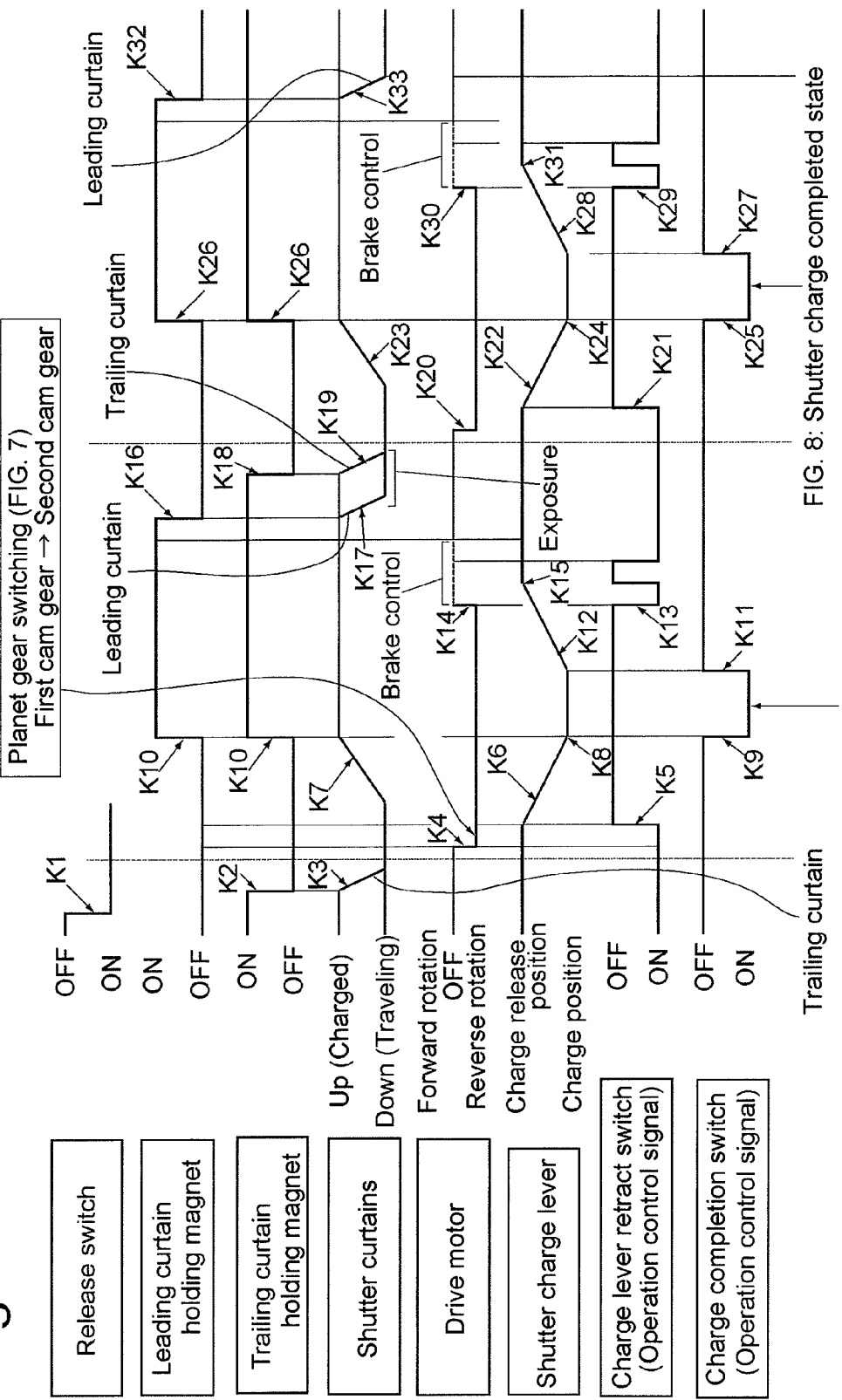
FIG. 14 is a timing chart showing a photographing operation in the live view mode.
Figure 17:
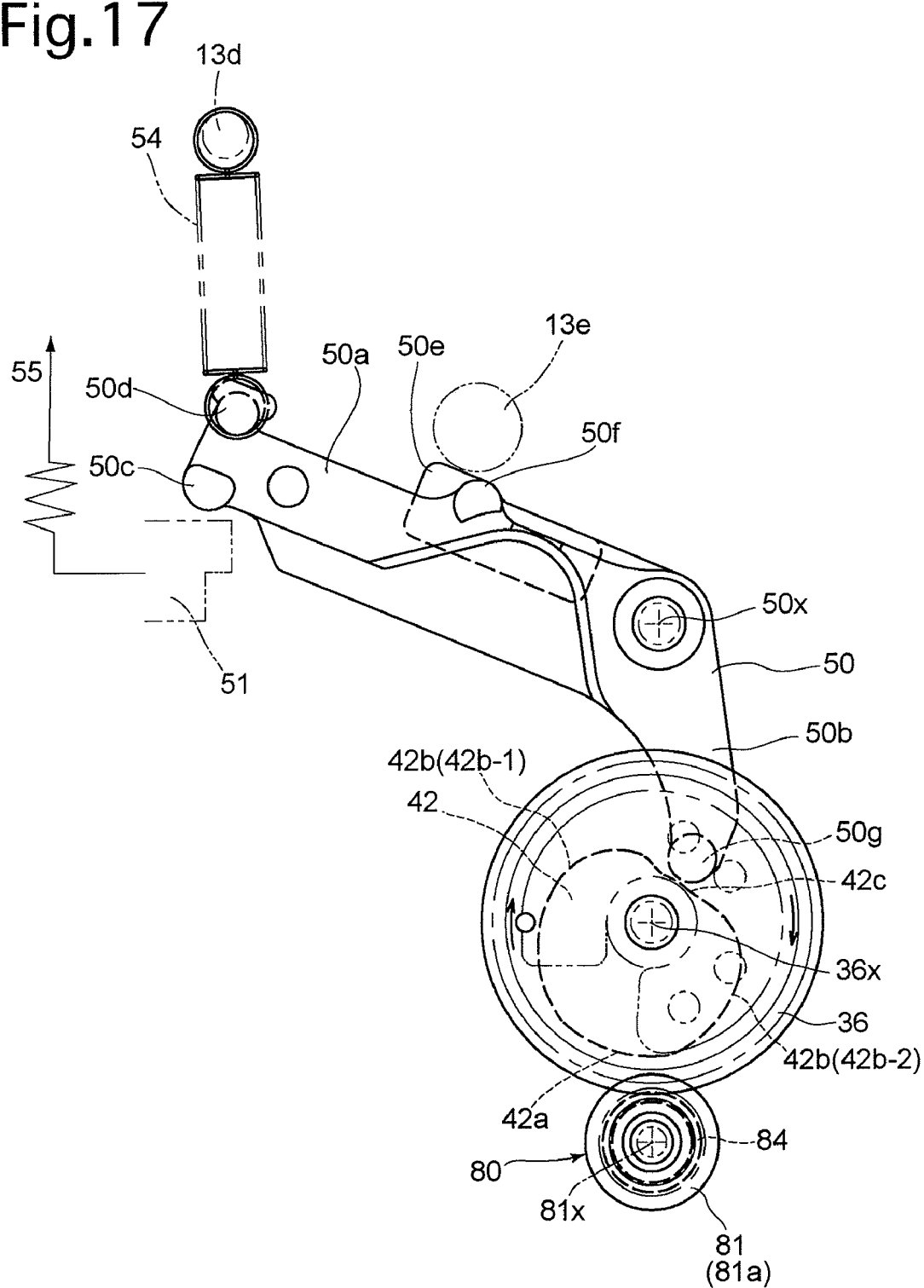
FIG. 17 is a side elevational view of the second cam-incorporated gear, the shutter charge lever and associated elements, showing the relative position between the second cam-incorporated gear and the shutter charge lever when the second cam-incorporated gear is positioned at the origin position thereof shown in FIG. 7.

On the other hand, in the live view mode (in this state the mirror/shutter drive mechanism 20 is in the state shown in FIGS. 6 and 16) after the traveling of the leading curtain 15a (V12) shown in FIG. 13, a photographing operation can be performed by turning ON the release switch 61. The timing chart shown in FIG. 14 shows this photographing operation in the live view mode. Upon the release switch 61 being turned ON (see K1 shown in FIG. 14; refer to FIG. 14 when a numeral with the prefix "K" is found in the following descriptions), firstly the passage of current through the trailing curtain holding magnet 53 is cutoff (see K2), which causes the trailing curtain 15b to travel to temporarily shut the shutter 15. Thereupon, the shutter 15 is in an uncharged state, therefore the shutter 15 is recharged for the subsequent photographing operation. Although a shutter charge operation is performed by rotating the first cam-incorporated gear 35 by a forward rotation of the drive motor 22 in normal exposure mode shown in FIG. 12, the drive motor 22 is driven reverse (see K4) after completion of travel of the trailing curtain 15b when a picture is taken in the live view mode. The reverse driving of the drive motor 22 causes the sun gear 31 to rotate clockwise with respect to FIG. 6 via the motor pinion 23 and the reduction gears 24, 25 and 26. The planet gear 33 is pressed against the planetary gear arm 32 with a predetermined degree of friction by the biasing force of the planetary gear friction spring 34, and accordingly, this clockwise rotation of the sun gear 31 causes the planet gear 33 to revolve around the sun gear 31 while rotating the planet gear arm 32 clockwise with respect to FIG. 6 about the rotational shaft 31x, thus causing the planet gear 33 to be disengaged from the first cam-incorporated gear 35 and be engaged with the second cam-incorporated gear 36 (see FIG. 10). FIGS. 7 and 17 show a state of the planetary gear mechanism 30 immediately after the planet gear 33 is engaged with the second cam-incorporated gear 36 after disengagement from the first cam-incorporated gear 35. The second cam-incorporated gear 36 continues to be held at the origin position since no motor driving force is transmitted to the second cam-incorporated gear 36 from the initial state shown in FIGS. 5 and 15 to the exposure possible state shown in FIGS. 6 and 16, and remains at the origin position even in the state shown in FIGS. 7 and 17. Thereafter, upon the planet gear 33 being engaged with the second cam-incorporated gear 36, the engagement between the sub-arm 32a and the swing movement limit protrusion 13b prevents the planetary gear arm 32 from further rotating, and from then on the second cam-incorporated gear 36 is rotated clockwise from the origin position shown in FIGS. 7 and 17 by a reverse driving force of the drive motor 22.

When taking a picture in the live view mode, the driving operation of the drive motor 22 is controlled by the charge completion switch 65 and the charge lever retract switch 66 that are turned ON and OFF according to the rotational position (relative position between the code plate brush 38 and the code plate 39) of the second cam-incorporated gear 36. When the second cam-incorporated gear 36 is at the origin position as shown in FIGS. 7 and 17, the charge lever retract switch 66 is ON due to contact engagement between the code plate brush 38 and the cod plate 39; however, a rotation of the second cam-incorporated gear 36 from the origin position changes the relative contact position between the code plate brush 38 and the code plate 39 to thereby turn OFF the charge lever retract switch 66 (see K5). Subsequently, a predetermined amount of rotation of the second cam-incorporated gear 36 from the origin position causes the second shutter control cam 42 to come into contact with the second cam follower 50g and lift the second cam follower 50g to rotate the shutter charge lever 50 from the charge release position toward the charge position against the biasing force of the charge lever restoring spring 54 (see K6). This rotation of the shutter charge lever 50 causes the shutter setting lever 51 to rotate from the shutter release position toward the shutter holding position against the biasing force of the setting lever restoring spring 55 so that a shutter charge operation for the leading curtain 15a and the trailing curtain 15b is performed (see K7). Upon the second cam-incorporated gear 36 reaching the shutter charge completion position shown in FIGS. 8 and 18, the shutter charge lever 50 is positioned in the shutter charge position, which completes the shutter charge operation (see K8). Thereupon, the charge completion switch 65 is turned ON (see K9). In response to this signal input from the charge completion switch 65, the leading curtain holding magnet 52 and the trailing-curtain holding magnet 53 are energized to hold the leading curtain 15a and the trailing curtain 15b magnetically (see K10).

Even after the completion of this shutter charge operation, the drive motor 22 continues to be driven reverse to rotate the second cam-incorporated gear 36, which causes the charge completion switch 65 to be turned OFF (see K11). Subsequently, the lifted state of the second cam follower 50g by the second shutter control cam 42 is gradually released, which causes the shutter charge lever 50 to rotate from the charge position shown in FIGS. 8 and 18 toward the charge release position shown in FIGS. 7 and 17 by the biasing force of the charge lever restoring spring 54 (see K12). After a short period of time, the charge lever retract switch 66 is turned ON (see K13), and in response to this ON signal from the charge lever retract switch 66, the reverse driving of the drive motor 22 is stopped (see K14). At this time, the second cam-incorporated gear 36 has already returned to the origin position shown in FIGS. 7 and 17, and the shutter charge lever 50 is held in the charge release position by the biasing force of the charge lever restoring spring 54 (see K15). In addition, following the shutter charge lever 50, the shutter setting lever 51 is also held in the shutter release position by the biasing force of the setting lever restoring spring 55.

Similar to the normal exposure mode, the passage of current through the leading curtain holding magnet 52 is stopped (see K16), and thereupon the leading curtain 15a of the shutter 15 travels (see K17). Subsequently, upon a lapse of a predetermined period of time corresponding to the set shutter speed, the passage of current through the trailing curtain holding magnet 53 is stopped (see K18), and thereupon the trailing curtain 15b travels (see K19) to perform an exposure operation. After completion of this exposure operation, the shutter 15 is shut, and accordingly, the second cam-incorporated gear 36 is rotated one more revolution from the origin position to open the shutter 15 so that the camera 10 moves back to a live view state, in which an electronic object image captured by the image sensor 16 is indicated in real-time on the LCD monitor 18. Controls and operations performed through the above-mentioned one more revolution of the second cam-incorporated gear 36 are similar to the above described controls and operations at K4 through K15, and therefore will be briefly discussed hereinafter. First, after the traveling of the trailing curtain 15b, the drive motor 22 is driven in reverse to make the second cam-incorporated gear 36 commence rotating (see K20), and thereafter the charge lever retract switch 66 is turned OFF (see K21). Following the rotation of the second cam-incorporated gear 36, the second shutter control cam 42 again comes into contact with the second cam follower 50g and lifts the second cam follower 50g, which causes the shutter charge lever 50 to rotate from the charge release position toward the charge position (see K22), so that the shutter 15 is charged (see K23). After a short period of time, upon the second cam-incorporated gear 36 reaching the shutter charge completion position shown in FIGS. 8 and 18, the shutter charge lever 50 is held in the charge position (see K24), the charge completion switch 65 is turned ON (see K25), and in response to this ON signal from the charge completion switch 65 the leading curtain holding magnet 52 and the trailing curtain holding magnet 53 are energized to hold the leading curtain 15a and the trailing curtain 15b, respectively (see K26). Subsequently, the reverse driving of the drive motor 22 continues, the charge completion switch 65 is turned OFF (see K27), and the pressed state of the second cam follower 50g by the second shutter control cam 42 is gradually released, which causes the shutter charge lever 50 to rotate to the charge release position again by the biasing force of the charge lever restoring spring 54 (see K28). In a short period of time thereafter, it is detected that the charge lever retract switch 66 is turned ON (see K29), and thereupon the reverse driving of the drive motor 22 is stopped (see K30), and the shutter charge lever 50 is held in the charge release position (see K31). At this stage, the passage of current through the leading curtain holding magnet 52 is cut off (see K32) so that the leading curtain 15a travels (see K33) and the trailing curtain 15b is held so that it does not travel, thereby moving the camera 10 into the same live view state as that after the traveling of the leading curtain 15a at the operation V12 shown in FIG. 13.

When a picture is taken in the live view mode shown in FIG. 14, the planet gear 33 is in mesh with the second cam-incorporated gear 36 while the first cam-incorporated gear 35 remains in the mirror-up completion position shown in FIGS. 6 through 8 and 16, so that the mirror 14 remains held in the upper retracted position. Namely, when a picture is taken in the live view mode, the mirror 14 does not perform an up/down operation at all.

In live view state after the travel of the leading curtain at K33, upon the live view switch 62 is turned OFF to end the live view mode, operations similar to the above described operations at V13 through V22 shown in FIG. 13 are performed and the mirror-shutter drive mechanism 20 returns to the initial state shown in FIGS. 5 and 15. However, after the completion of the photographing operation in the live view mode shown in FIG. 14, the planet gear 33 is engaged with the second cam-incorporated gear 36, not with the first cam-incorporated gear 35, which is different from the case where control exits the live view mode without making the mirror-shutter drive mechanism 20 perform a photographing operation (more specifically, control exits the live view mode by performing only the processes shown in FIG. 13, i.e., without entering the photographing operation shown in FIG. 14). Therefore, in the case where control carries out the photographing operation in the live view mode shown in FIG. 14, a gear switching operation is carried out, in which the planet gear 33 is disengaged from the second cam-incorporated gear 36 to be re-engaged with the first cam-incorporated gear 35 when the drive motor 22 is driven forward at V16 shown in FIG. 13. Due to this gear switching operation, the mirror/shutter drive mechanism 20 returns to the state shown in FIG.

6 from the state shown in FIG. 7, and thereafter, the above described finalization process in the live view mode is performed (see V17 through V22).

As described above, in the present embodiment of the mirror/shutter drive mechanism 20, by transmitting a motor driving force selectively to the first cam-incorporated gear 35 and the second cam-incorporated gear 36 via the planetary gear mechanism 30 in accordance with forward and rearward rotations of the drive motor 22, a shutter charge operation can be performed with no up/down operation of the mirror 14 in a photographing operation during the live view mode. In addition, the mirror/shutter drive mechanism 20 has a structure, which will be discussed hereinafter, in which the planet gear 33 of the planetary gear mechanism 30 is reliably selectively engaged with the first cam-incorporated gear 35 and the second cam-incorporated gear 36 to achieve high-precision driving.

As described above, the cam follower 45b of the mirror drive lever 45 and the first cam follower 50f of the shutter charge lever 50 come in contact with the mirror control cam and the first shutter control cam 41 of the first cam-incorporated gear 35, respectively. The biasing force of the mirror-down spring 47 for biasing the mirror drive lever 45 so that it rotates is transmitted from the cam follower 45b to the first cam-incorporated gear 35 via the mirror control cam 40. In addition, the biasing force of the charge lever restoring spring 54 for biasing the shutter charge lever 50 so that it rotates and the biasing force of the setting lever restoring spring 55 for biasing the shutter setting lever 51 so that it rotates are transmitted from the first cam follower 50f to the first cam-incorporated gear 35 via first shutter control cam 41. In addition, a shutter charge load (shutter curtain traveling force) from the shutter 15 acts on the first cam-incorporated gear 35 from the shutter setting lever 51 via the first cam follower 50f of the shutter charge lever 50. The shutter charge load is a reaction force that exists when the leading curtain 15a and the trailing curtain 15b are charged, or a charge releasing force that exists when the leading curtain 15a and the trailing curtain 15b have been charged and not held by the leading curtain holding magnet 52 and the trailing curtain holding magnet 53, respectively.

Although the first cam-incorporated gear 35 is rotated by receiving a driving force from the drive motor 22 while being engaged with the planet gear 33, there is a possibility of the first cam-incorporated gear 35 being prevented from being securely engaged with the planet gear 33 when a certain degree of external force is exerted on the first cam-incorporated gear 35 from the mirror drive lever 45 or the shutter charge lever 50, each of which is driven by the first cam-incorporated gear 35. Specifically, this certain degree of external force consists of a surplus force (hereinafter referred to as a surplus torque) which urges the first cam-incorporated gear to rotate in the direction of rotation of the first cam-incorporated gear 35 caused by rotation of the planet gear (i.e., the counterclockwise direction of the first cam-incorporated gear 35 with respect to FIGS. 5 through 8). If it is attempted to transmit rotation from the planet gear 33 to the first cam-incorporated gear 35 under a condition in which such a surplus torque acts on the first cam-incorporated gear 35, there is a possibility of the planet gear 33 behaving in a manner so as to bounce on the first cam-incorporated gear 35 and disengage therefrom toward the second cam-incorporated gear 36. The first frictional gear mechanism 70 prevents such a surplus torque from acting on the first cam-incorporated gear 35. The function of the frictional gear mechanism 70 will be discussed later.

As shown by a broken line in FIGS. 9, 10, 15, 16, 20 and 21, the mirror control cam 40 is provided with a constant-radius cam portion 40a, two non-constant-radius cam portions 40b (40b-1 and 40b-2), and a relief cam portion 40c. The constant-radius cam portion 40a is greater in radius than the two non-constant-radius cam portions 40b and the relief cam portion 40c, is formed at the maximum outer radial position on the mirror control cam 40 about the rotational shaft 35x and shaped so that the radial distance from the rotational shaft 35x to the constant-radius cam portion 40a does not vary in the rotational direction about the rotational shaft 35x. The relief cam portion 40c is smaller in radius than the constant-radius cam portion 40a and the two non-constant-radius cam portions 40b, and is formed at a position on the mirror control cam 40 which is closer to the rotational shaft 35x than the constant-radius cam portion 40a in a radial direction. The two non-constant-radius cam portions 40b are formed between the constant-radius cam portion 40a and the relief cam portion 40c so that the constant-radius cam portion 40a and the relief cam portion 40c are connected via the two non-constant-radius cam portions 40b, and each non-constant-radius cam portion 40b is shaped so that the distance from the rotational shaft 35x to the non-constant-radius cam portion 40b varies in the rotational direction about the rotational shaft 35x. Each non-constant-radius cam portion 40b is formed on a portion of the mirror control cam 40 between the constant-radius cam portion 40a and the relief cam portion 40c and does not have any portion which either projects radially outwards by a greater degree than the constant-radius cam portion 40a or recessed radially inwards by a greater degree than the relief cam portion 40c. The two non-constant-radius cam portions 40b are respectively formed at both ends of the constant-radius cam portion 40a (or in other words, at both ends of the relief cam portion 40c), and consist of a first non-constant-radius cam portion 40b-1 and a second non-constant-radius cam portion 40b-2 as shown in the drawings. The first non-constant-radius cam portion 40b-1 and the second non-constant-radius cam portion 40b-2 are mutually different in shape (cam curve). The boundary between the relief cam portion 40c and the first non-constant-radius cam portion 40b-1 is shaped into a concave surface which is recessed toward the rotational shaft 35x, contrary to the adjacent convex cam surfaces.

Figure 20:
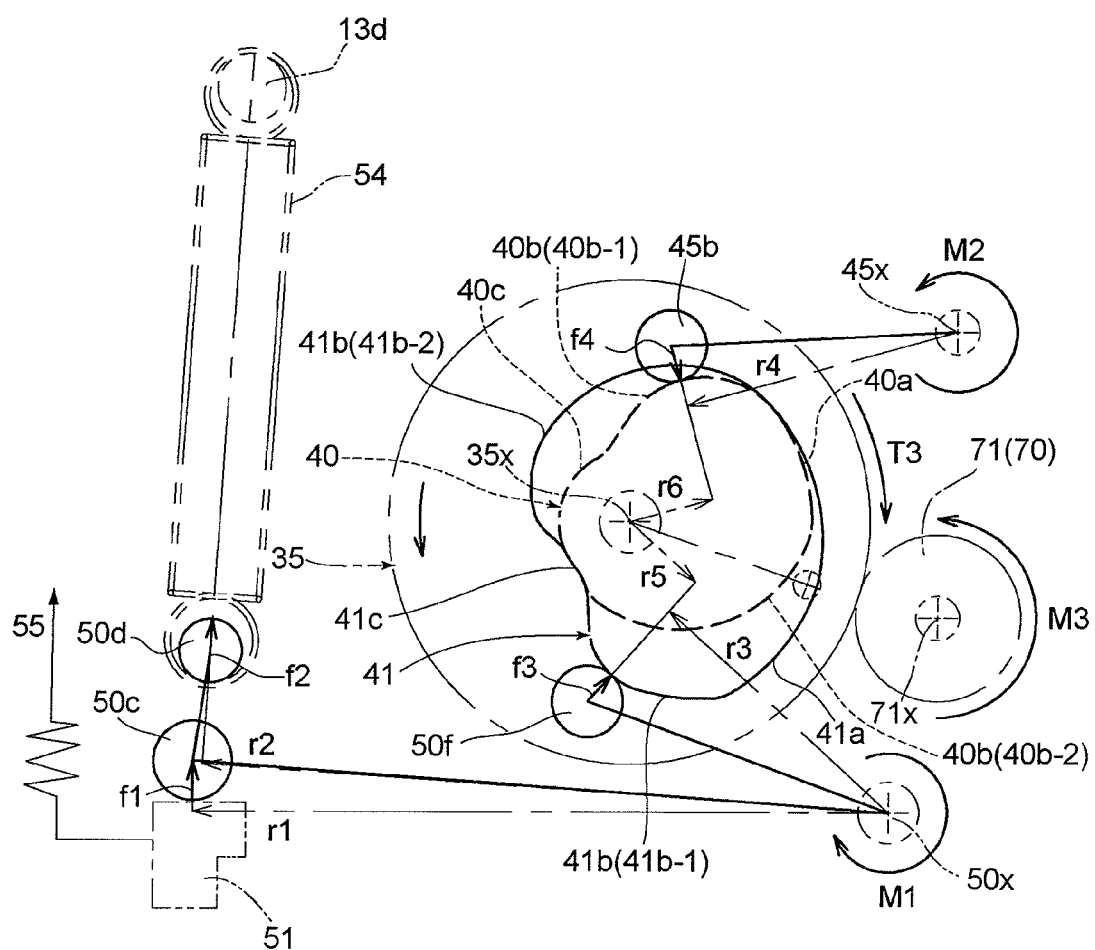
FIG. 20 is a conceptual diagram showing the relationship between forces acting on the first cam-incorporated gear by the mirror drive lever, the shutter charge lever and the first frictional gear mechanism in a state where the first cam-incorporated gear is in the process of being rotated toward the mirror-up completion position shown in FIG. 6 from the origin position shown in FIG. 5 in a normal photography operational-sequence.
Figure 21:
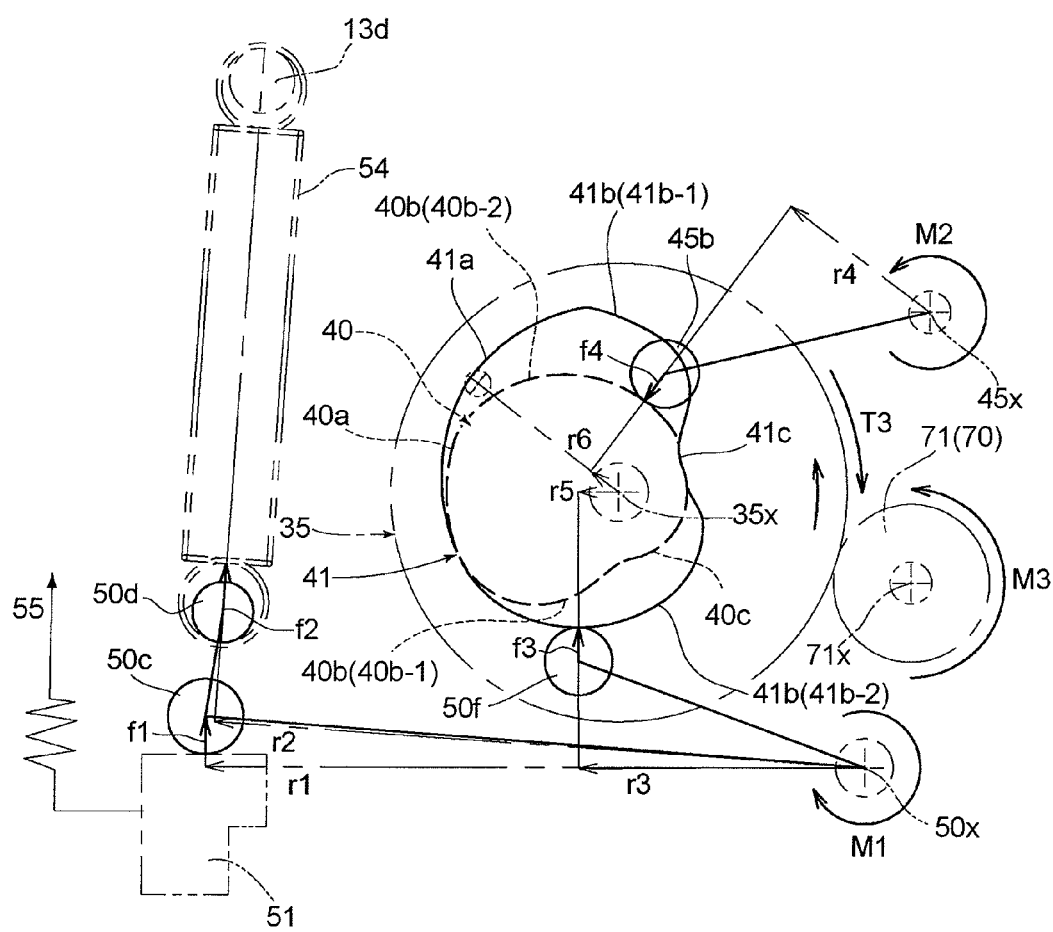
FIG. 21 is a conceptual diagram showing the relationship between forces acting on the first cam-incorporated gear by the mirror drive lever, the shutter charge lever and the first frictional gear mechanism in a state where the first cam-incorporated gear is in the process of being rotated toward the origin position shown in FIG. 5 from the mirror-up completion position shown in FIG. 6 in the normal photography operational-sequence.

In addition, as shown by a solid line in FIGS. 20 and 21, the first shutter control cam 41 is provided with a constant-radius cam portion 41a, two non-constant-radius cam portions 41b (41b-1 and 41b-2) and a relief (recessed) cam portion 41c. The constant-radius cam portion 41a is greater in radius than the two non-constant-radius cam portions 41b and the relief cam portion 41c, is formed at the maximum outer radial position on the first shutter control cam 41 about the rotational shaft 35x and shaped so that the radial distance from the rotational shaft 35x to the constant-radius cam portion 41a does not vary in the rotational direction about the rotational shaft 35x. The relief cam portion 41c is smaller in radius than the constant-radius cam portion 41a and the two non-constant-radius cam portions 41b, and is formed at a position on the first shutter control cam 41 which is closer to the rotational shaft 35x than the constant-radius cam portion 41a in a radial direction. The two non-constant-radius cam portions 41b are formed between the constant-radius cam portion 41a and the relief cam portion 41c so that the constant-radius cam portion 41a and the relief cam portion 41c are connected via the two non-constant-radius cam portions 41b, and each non-constant-radius cam portion 41b is shaped so that the distance from the rotational shaft 35x to the non-constant-radius cam portion 41b varies in the rotational direction about the rotational shaft 35x. Each non-constant-radius cam portion 41b is formed on a portion of the first shutter control cam 41 between the constant-radius cam portion 41a and the relief cam portion 41c and does not have any portion which either projects radially outwards by a greater degree than the constant-radius cam portion 41a or recessed radially inwards by a greater degree than the relief cam portion 41c. The two non-constant-radius cam portions 41b are respectively formed at both ends of the constant-radius cam portion 41a (or in other words, at both ends of the relief cam portion 41c), and consist of a first non-constant-radius cam portion 41b-1 and a second non-constant-radius cam portion 41b-2 as shown in the drawings. The first non-constant-radius cam portion 41b-1 and the second non-constant-radius cam portion 41b-2 are mutually different in shape (cam curve). The relief cam portion 41c is shaped into a concave surface which is recessed toward the rotational shaft 35x, contrary to the adjacent convex cam surfaces.

The mirror drive lever 45 is held in the mirror-up position when the cam follower 45b of the mirror drive lever 45 comes in contact with the constant-radius cam portion 40a of the mirror control cam 40. When the mirror drive lever 45 is in the mirror-up position, the cam follower 45b is spaced most apart from the rotational shaft 35x of the first cam-incorporated gear 35 (i.e., positioned at a cam-axis separated position) while the amount of bending (turning) of the mirror-down spring 47 becomes maximum. Conversely, the mirror drive lever 45 is held in the mirror-down position when the cam follower 45b faces the relief cam portion 40c of the mirror control cam 40. The mirror-down position of the mirror drive lever 45 is defined by making the retaining portion 45a contact the mirror sheet boss 14a by the biasing force of the mirror-down spring 47 in a state where the mirror 14 is held in the down position while being in contact with the limit pin 19. At this time, although the cam follower 45b is in a state of being positioned closest to (in the immediate vicinity) the rotational shaft 35x of the first cam-incorporated gear 35 (i.e., positioned at a cam-axis vicinity position), the cam follower 45b is not in contact with the relief cam portion 40c.

When the first cam follower 50f of the shutter charge lever 50 comes in contact with the constant-radius cam portion 41a of the first shutter control cam 41, the shutter charge lever 50 is held in the charge position. When the shutter charge lever 50 is in the charge position, the first cam follower 50f is spaced most apart from the rotational shaft 35x of the first cam-incorporated gear 35 (i.e., positioned at a cam-axis separated position) while the amount of extension of each of the charge lever restoring spring 54 and the setting lever restoring spring 55 is maximum. Conversely, the shutter charge lever 50 is held in the charge release position when the first cam follower 50f faces the relief cam portion 41c of the first shutter control cam 41. The charge release position of the shutter charge lever 50 is defined by making the stopper portion 50e contact the swing limit protrusion 13e by the biasing forces of the charge lever restoring spring 54 and the setting lever restoring spring 55. At this time, although the first cam follower 50f is in a state of being positioned closest to (in the immediate vicinity) the rotational shaft 35x of the first cam-incorporated gear 35 (i.e., positioned at a cam-axis vicinity position), the first cam follower 50f is not in contact with the relief cam portion 41c.

FIGS. 20 and 21 schematically show the relationship between forces acting on the first cam-incorporated gear 35 at different rotational positions thereof. In FIGS. 20 and 21, the arrow f1 represents the force acting on the first cam-incorporated gear 35 from the shutter setting lever 51; more specifically, the arrow f1 shown in FIG. 20 represents the biasing force (restoring force) of the setting lever restoring spring 55 and the arrow f1 shown in FIG. 21 represents a combination of the biasing force (restoring force) of the setting lever restoring spring 55 and the load on the first cam-incorporated gear 35 which is caused when the shutter 15 is charged. In FIGS. 20 and 21, the arrow f2 represents the biasing force (restoring force) of the charge lever restoring spring 54, the arrow f3 represents the pressure force of the first cam follower 50f on a cam surface of the first shutter control cam 41, the arrow f4 represents the pressure force of the cam follower 45b of the mirror drive lever 45 on a cam surface of the mirror control cam 40. In addition, in FIGS. 20 and 21, the arrow r1 represents the radial distance from the center of rotation of the shutter charge lever 50 (i.e., the axis of the rotational shaft 50x) to the arrow f1, the arrow r2 represents the radial distance from the center of rotation of the shutter charge lever 50 (i.e., the axis of the rotational shaft 50x) to the arrow f2, the arrow r3 represents the radial distance from the center of rotation of the shutter charge lever 50 (i.e., the axis of the rotational shaft 50x) to the arrow f3, the arrow r4 represents the radial distance from the center of rotation of the mirror drive lever 45 (i.e., the axis of the rotational shaft 45x) to the arrow f4, the arrow r5 represents the radial distance from the center of rotation of the first cam-incorporated gear 35 (i.e., the axis of the rotational shaft 35x) to the arrow f3, and the arrow r6 represents the radial distance from the center of rotation of the first cam-incorporated gear 35 (i.e., the axis of the rotational shaft 35x) to the arrow f4. In FIGS. 20 and 21, the arrow M1 represents the rotational moment of the shutter charge lever 50 produced by the forces f1 and f2, the arrow M2 represents the rotational moment of the mirror drive lever 45 produced by the mirror-down spring 47, and the arrow M3 represents the rotational load moment produced in the first friction gear 71 by the friction spring 74 in the first frictional gear mechanism 70. In the following descriptions, T1 designates the surplus torque acting on the first cam-incorporated gear 35 by the mirror drive lever 45 or the shutter charge lever 50 in the same rotational direction as the rotational direction of the first cam-incorporated gear (i.e., the counterclockwise direction of the first cam-incorporated gear 35), T2 designates the load torque acting on the first cam-incorporated gear 35 by the mirror drive lever 45 or the shutter charge lever 50 in the direction opposite to the direction of rotation of the first cam-incorporated gear 35, and T3 designates the load torque acting on the first cam-incorporated gear 35 by the first friction gear 71 when the first cam-incorporated gear 35 rotates.

First of all, variations in load on the first cam-incorporated gear 35 from the origin position to the mirror-up completion position that are caused by the mirror drive lever 45 and the shutter charge lever 50 will be discussed hereinafter. The mirror drive lever 45 (mirror drive system) serves as a source by which the load torque T2 acts on the first cam-incorporated gear 35 because the mirror control cam 40 continues to press the mirror drive lever 45 toward the mirror-up position (in which the cam follower 45b is positioned at the cam-axis separated position thereof) against the biasing force of the mirror-down spring 47 from the origin position until the mirror-up completion position. On the other hand, the shutter charge lever 50 is gradually released from the pressure of the first shutter control cam 41 to thereby rotate toward the charge release position (in which the first cam follower 50f is positioned at the cam-axis vicinity position thereof) by the biasing forces of the charge lever restoring spring 54 and the setting lever restoring spring 55, and accordingly, the shutter charge lever 50 (the shutter charge system) serves as a source by which the surplus torque T1 acts on the first cam-incorporated gear 35. The surplus torque T1 and the load torque T2 during the operation of the first cam-incorporated gear 35 from the origin position to the mirror-up completion position can be determined by the following equations (1) and (2), respectively:

$$T1 = f3 \times r5 \quad (1)$$

wherein f3=M1/r3, M1=f1×r1+f2×r2, $$T2 = f4 \times r6 \quad (2)$$

wherein f4=M2/r4.

At the origin position of the first cam-incorporated gear 35, as shown in FIG. 15, since the mirror drive lever 45 is held in the mirror-down position (in which the cam follower 45b is positioned at the cam-axis vicinity position thereof) by making the mirror retaining portion 45a contact the mirror sheet boss 14a of the mirror 14 which is held in the down position via contact engagement with the limit pin 19, and since the cam follower 45b faces the relief cam portion 40c of the mirror control cam 40 with a slight distance therebetween, no torque acts on the first cam-incorporated gear 35 from the mirror drive lever 45. Namely, T2 is equal to zero (T2=0). In addition, the shutter charge lever 50 is held in the charge position (in which the first cam follower 50f is positioned at the cam-axis separated position thereof) by making the first cam follower 50f contact the constant-radius cam portion 41a of the first shutter control cam 41. In this state where the first cam follower 50f is in contact with the constant-radius cam portion 41a, r5 is equal to zero (r5=0) since the direction of action of f3 is coincident with a radial direction of the first cam-incorporated gear 35 about the rotational shaft 35x, so that the equation "T1=f3×0=0" is satisfied. Accordingly, at this time, the first cam-incorporated gear 35 receives no torque from either the mirror drive lever 45 or the shutter charge lever 50.

FIG. 20 shows a state where the first cam-incorporated gear 35 is in the process of being rotated toward the mirror-up completion position shown in FIGS. 6 and 16 from the origin position shown in FIGS. 5 and 15. As can be seen from FIG. 20, the cam follower 45b of the mirror drive lever 45 moves from a state of being spaced from and facing the relief cam portion 40c of the mirror control cam 40 to a state of being in contact with the first non-constant-radius cam portion 40b-1 and pushed up thereby, which causes the mirror 14 to commence rotating toward the upper retracted position (this rotation is shown by U4 in FIG. 12). Thereupon, the direction of action of f4 does not coincide with a radial direction of the rotational shaft 35x, and accordingly, r6 becomes unequal to zero (r6≠0), so that the rotational moment M2 of the mirror drive lever 45 comes to act as the load torque T2 on the first cam-incorporated gear 35. Further rotation of the first cam-incorporated gear 35 causes the first cam follower 50f of the shutter charge lever 50 to change the contact position thereof with the first shutter control cam 41 from the constant-radius cam portion 41a to the first non-constant cam portion 41b-1, which causes the shutter charge lever 50 to commence rotating toward the charge release position (this rotation is shown by U6 in FIG. 12). Thereupon, the direction of action of f3 changes so that r5 becomes unequal to zero (i.e., r5≠0), so that the rotational moment M1 of the shutter charge lever 50 comes to act as the surplus torque T1 on the first cam-incorporated gear 35. At this stage, even if the surplus torque T1 that acts on the first cam-incorporated gear 35 by the shutter charge lever 50 becomes greater than the load torque T2 that acts on the first cam-incorporated gear 35 by the mirror drive lever 45, a load torque (counter torque) which exclusively counters the surplus torque T1 continuously acts on the first cam-incorporated gear 35 via the first friction gear 71, namely, the rotational load moment M3 in the first frictional gear mechanism 70 (i.e., which is applied to the first friction gear 71 by the friction spring 74) is set so as to impose such a counter torque on the first cam-incorporated gear 35 continuously via the first friction gear 71, i.e., so as to satisfy a condition "T1≦T2+T3" at all times.

In a state where the first cam-incorporated gear 35 has reached the mirror-up completion position shown in FIGS. 6 and 16, the first cam follower 50f moves from a state of being in contact with the first non-constant-radius cam portion 41b-1 of the first shutter control cam 41 to a state of being slightly spaced from and facing the recessed cam portion 41c of the first shutter control cam 41, so that the shutter charge lever 50 is held in the charge release position (in which the first cam follower 50f is positioned at the cam-axis vicinity position thereof) by engagement of the stopper portion 50e with the swing limit protrusion 13e (see U10 shown in FIG. 12). This causes the surplus torque T1 to stop acting on the first cam-incorporated gear 35. In addition, the cam follower 45b of the mirror drive lever 45 comes into contact with the constant-radius cam portion 40a of the mirror control cam 40 so that the mirror drive lever 45 is held in the mirror-up position (in which the cam follower 45b is positioned at the cam-axis separated position thereof). In the state where the cam follower 45b is in contact with the constant-radius cam portion 40a, the radial distance r6 is equal to zero (r6=0), which consequently makes the load torque T2 become zero. Accordingly, at this time, the first cam-incorporated gear 35 receives no torque from either the mirror drive lever 45 or the shutter charge lever 50.

When the first cam-incorporated gear 35 rotates to the origin position shown in FIGS. 5 and 15 after completion of the travel of the leading and trailing shutter curtains 15a and 15b, the shutter charge lever 50 is gradually pressed toward the charge position (in which the first cam follower 50f is positioned at the cam-axis separated position thereof) by the first shutter control cam 41 against the biasing forces of the charge lever restoring spring 54, the setting lever restoring spring 55 and the shutter charge load, conversely to the operation at the time the first-incorporated gear 35 rotates from the origin position to the mirror-up completion position; accordingly, the shutter charge lever 50 (the shutter charge system) serves as a source of acting the load torque T2 on the first cam-incorporated gear 35. On the other hand, the pressure on the mirror drive lever 45 by the mirror control cam 40 is gradually released, so that the mirror drive lever 45 is rotated toward the mirror-down position (in which the cam follower 45b is positioned at the cam-axis vicinity position thereof) by the biasing force of the mirror-down spring 47, and accordingly, the mirror drive lever 45 (the mirror drive system) serves as a source of acting the surplus torque T1 on the first cam-incorporated gear 35. The surplus torque T1 and the load torque T2 during the operation of the first cam-incorporated gear 35 from the mirror-up completion position to the origin position can be determined by the following equations (3) and (4), respectively:

$$T1 = f4 \times r6 \quad (3)$$

wherein f4=M2/r4, $$T2 = f3 \times r5 \quad (4)$$

wherein f3=M1/r3, M1=f1×r1+f2×r2.

FIG. 21 shows a state where the first cam-incorporated gear 35 is in the process of being rotated toward the origin position shown in FIGS. 5 and 15 from the mirror-up completion position shown in FIGS. 6 and 16. As shown in FIG. 21, the first cam follower 50f of the shutter charge lever 50 moves from a state of being spaced from and facing the recessed cam portion 41c of the first shutter control cam 41 to a state of being in contact with the second non-constant-radius cam portion 41b-2 and pushed down thereby, which causes the shutter charge lever 50 to start rotating toward the charge position of the shutter charge lever 50 (this rotation is shown by U17 in FIG. 12). Thereupon, due to the direction of action of f3, the rotational moment M1 of the shutter charge lever 50 comes to act as the load torque T2 on the first cam-incorporated gear 35. Further rotation of the first cam-incorporated gear 35 causes the first cam follower 45b of the mirror drive lever 45 to change the contact position thereof with the mirror control cam 40 from the constant-radius cam portion 40a to the second non-constant cam portion 40b-2, which causes the mirror drive lever 45 to commence rotating toward the mirror-down position (this rotation is shown by U19 in FIG. 12). Thereupon, the direction of action of f4 changes so that the rotational moment M2 of the mirror drive lever 45 comes to act as the surplus torque T1 on the first cam-incorporated gear 35. At this stage, even if the surplus torque T1 that acts on the first cam-incorporated gear 35 by the mirror drive lever 45 becomes greater than the load torque T2 that acts on the first cam-incorporated gear 35 by the shutter charge lever 50, a load torque (counter torque) which exclusively counters the surplus torque T1 continuously acts on the first cam-incorporated gear 35 via the first friction gear 71, namely, the rotational load moment M3 in the first frictional gear mechanism 70 (i.e., which is applied to the first friction gear 71 by the friction spring 74) is set so as to impose such a counter torque on the first cam-incorporated gear 35 continuously via the first friction gear 71, i.e., so as to satisfy the condition "T1≦T2+T3" at all times.

Accordingly, in a normal photography operational-sequence, the first frictional gear mechanism 70 imposes the load torque T3 on the first cam-incorporated gear 35 so as to satisfy the condition "T1≦T2+T3" at all times in either of the following two rotation sections of the first cam-incorporated gear 35: the rotation section from the origin position to the mirror-up completion position, and the rotation section from the mirror-up completion position to the origin position. With this structure, the relationship in action of forces between the planet gear 33 as a driver and the first cam-incorporated gear 35 as a follower (driven member) is maintained, which makes it possible to make the planet gear 33 reliably remain engaged with the first cam-incorporated gear 35.

In the present embodiment of the power transmission mechanism, as shown in the timing charts shown in FIGS. 12 and 13, when the first cam-incorporated gear 35 rotates, the commencement of rotation of one of the mirror drive lever 45 and the shutter charge lever 50 which exerts the load torque T2 on the first cam-incorporated gear 35 occurs before the commencement of rotation of the other of the mirror drive lever 45 and the shutter charge lever 50 which exerts the surplus torque T1 on the first cam-incorporated gear 35, and the termination of the rotation of one of the mirror drive lever 45 and the shutter charge lever 50 which exerts the load torque T2 on the first cam-incorporated gear 35 occurs after the termination of the other of the mirror drive lever 45 and the shutter charge lever 50 which exerts the surplus torque T1 on the first cam-incorporated gear 35. In other words, the present embodiment of the power transmission mechanism is constructed such that, when the surplus torque T1 acts on the first cam-incorporated gear 35 by one of the mirror drive lever 45 and the shutter charge lever 50, the load torque T2 simultaneously acts on the first cam-incorporated gear 35 by the other of the mirror drive lever 45 and the shutter charge lever 50 so that the surplus torque T1 and the load torque T2 mutually cancel each other out by the mirror drive lever 45 and the shutter charge lever 50. This allows the load torque T3 (the rotational load moment M3) to be small in the first frictional gear mechanism 70, which consequently achieves a reduction in load on the drive motor 22 for the driving of the first cam-incorporated gear 35. However, unlike the above described embodiment of the power transmission mechanism, it is possible that the first cam-incorporated gear 35 be provided with a rotation section via which the surplus torque T1 caused by either the mirror drive lever 45 or the shutter charge lever 50 solely acts on the first cam-incorporated gear 35. In accordance with this kind of configuration also, the surplus torque T1 can be canceled out by setting the load torque T3 caused by the first frictional gear mechanism 70 so as to satisfy T1≦T3.

Next, the structure for the control of the load on the second cam-incorporated gear 36 will be discussed hereinafter. As described above, the second cam follower 50g of the shutter charge lever 50 comes in contact with the second shutter control cam 42. The second cam-incorporated gear 36 is a gear which is rotated by receiving a driving force from the drive motor 22 while being engaged with planet gear 33; however, similar to the case of the first cam-incorporated gear 35, if it is attempted to transmit rotation from the planet gear 33 to the second cam-incorporated gear 36 under conditions that such a surplus torque (i.e., a force which urges the second cam-incorporated gear 36 to rotate in the direction of rotation thereof) acts on the second cam-incorporated gear 36, there is a possibility of the planet gear 33 behaving in a manner so as to bounce on the second cam-incorporated gear 36 and disengage therefrom toward the first cam-incorporated gear 35. The second frictional gear mechanism 80 prevents such a surplus torque from acting on the second cam-incorporated gear 36.

As shown in FIGS. 9, 10, 17, 18, 22 and 23, the second shutter control cam 42 of the second cam-incorporated gear 36 is provided with a constant-radius cam portion 42a, two non-constant-radius cam portions 42b (42b-1 and 42b-2) and a relief cam portion 42c. The constant-radius cam portion 42a is greater in radius than the two non-constant-radius cam portions 42b and the relief cam portion 42c, is formed at the maximum outer radial position on the second shutter control cam 42 about the rotational shaft 36x and shaped so that the radial distance from the rotational shaft 36x to the constant-radius cam portion 42a does not vary in the rotational direction about the rotational shaft 36x. The relief cam portion 42c is smaller in radius than the constant-radius cam portion 42a and the two non-constant-radius cam portions 42b, and is formed at a position on the second shutter control cam 42 which is closer to the rotational shaft 36x than the constant-radius cam portion 42a in a radial direction. The two non-constant-radius cam portions 42b are formed between the constant-radius cam portion 42a and the relief cam portion 42c so that the constant-radius cam portion 42a and the relief cam portion 42c are connected via the two non-constant-radius cam portions 42b, and each non-constant-radius cam portion 42b is shaped so that the distance from the rotational shaft 36x to the non-constant-radius cam portion 42b varies in the rotational direction about the rotational shaft 36x. Each non-constant-radius cam portion 42b is formed on a portion of the second shutter control cam 42 between the constant-radius cam portion 42a and the relief cam portion 42c and does not have any portion which either projects radially outwards by a greater degree than the constant-radius cam portion 42a or recessed radially inwards by a greater degree than the relief cam portion 42c. The two non-constant-radius cam portions 42b are respectively formed at both ends of the constant-radius cam portion 42*a* (or in other words, at both ends of the relief cam portion 42*c*), and consist of a first non-constant-radius cam portion 42*b*-1 and a second non-constant-radius cam portion 42*b*-2 as shown in the drawings. The first non-constant-radius cam portion 42*b*-1 and the second non-constant-radius cam portion 42*b*-2 are mutually different in shape (cam curve).

The shutter charge lever 50 is held in the charge position when the second cam follower 50*g* of the shutter charge lever 50 comes in contact with the constant-radius cam portion 42*a* of the second shutter control cam 42. When the shutter charge lever 50 is in the charge position, the second cam follower 50*g* is spaced most apart from the rotational shaft 36*x* of the second cam-incorporated gear 36 (i.e., positioned at a cam-axis separated position) while the amount of extension of each of the charge lever restoring spring 54 and the setting lever restoring spring 55 becomes maximum. Conversely, the shutter charge lever 50 is held in the charge release position when the second cam follower 50*g* faces the relief cam portion 42*c* of the second shutter control cam 42. As described above, the charge release position of the shutter charge lever 50 is defined by making the stopper portion 50*e* contact the swing limit protrusion 13*e* by the biasing forces of the charge lever restoring spring 54 and the setting lever restoring spring 55. At this time, although the second cam follower 50*g* is in a state of being positioned closest to (in the immediate vicinity) the rotational shaft 36*x* of the second cam-incorporated gear 36 (i.e., positioned at a cam-axis vicinity position), the second cam follower 50*g* is not in contact with the relief cam portion 42*c*.

Figure 22:
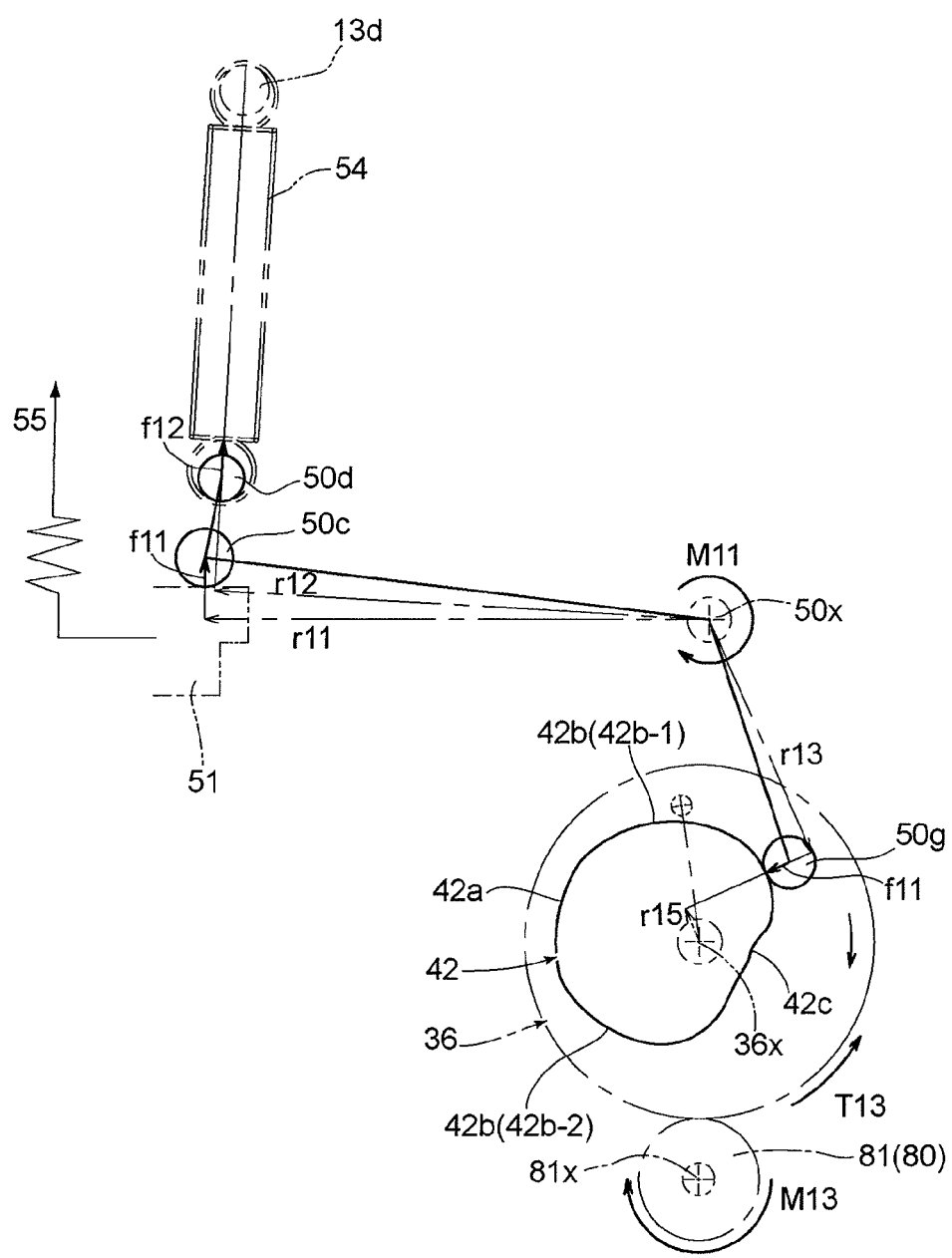
FIG. 22 is a conceptual diagram showing the relationship between forces acting on the second cam-incorporated gear by the shutter charge lever and the second frictional gear mechanism in a state where the second cam-incorporated gear is in the process of being rotated toward the shutter charge completion position shown in FIG. 8 from the origin position shown in FIG. 7 in a live-view mode photography operational-sequence.
Figure 23:
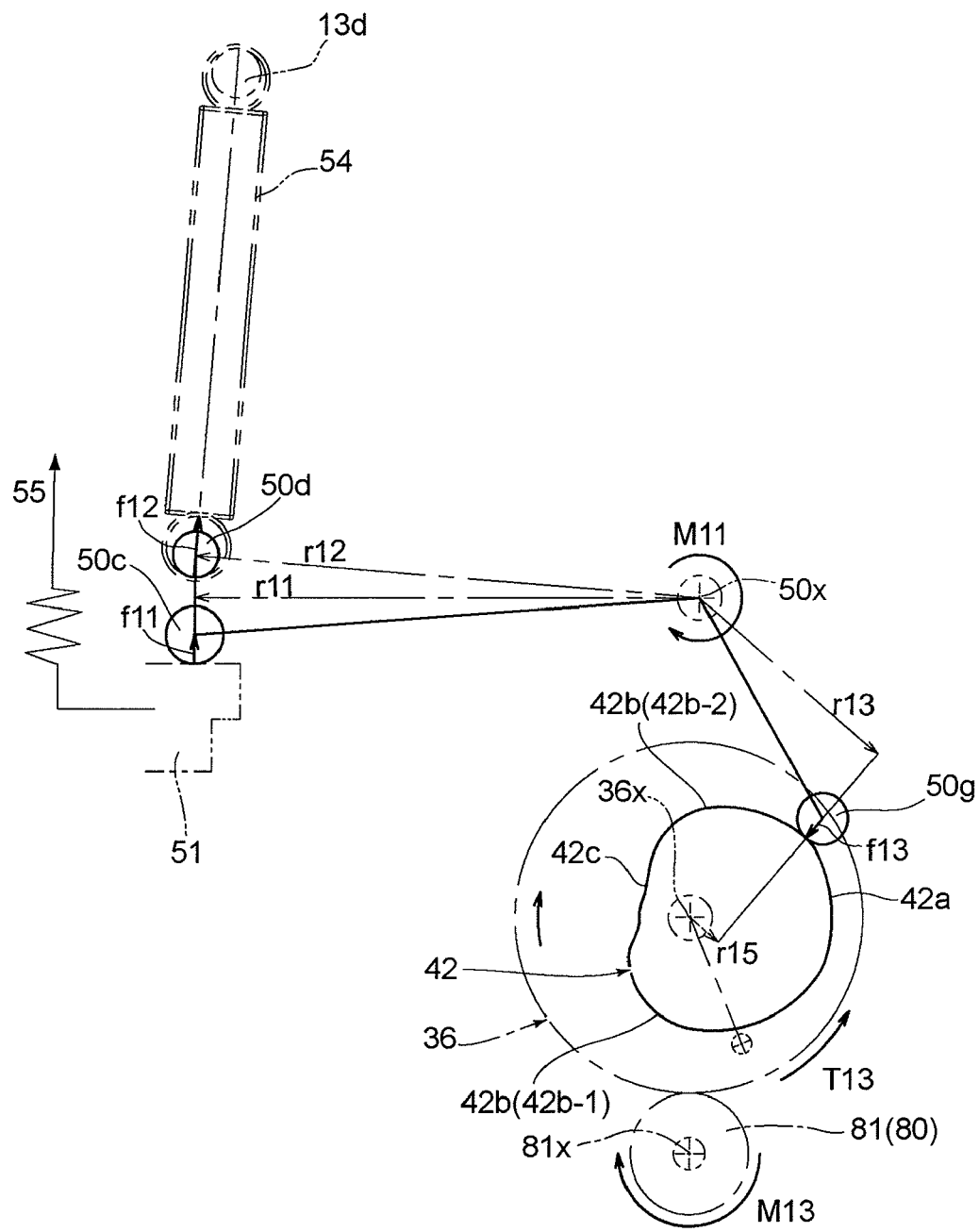
FIG. 23 is a conceptual diagram showing the relationship between forces acting on the second cam-incorporated gear by the shutter charge lever and the second frictional gear mechanism in a state where the second cam-incorporated gear is in the process of being rotated toward the origin position shown in FIG. 7 from the shutter charge completion position shown in FIG. 8 in a live-view mode photography operational-sequence.

FIGS. 22 and 23 schematically show the relationship between forces acting on the second cam-incorporated gear 36 in the live view mode. In FIGS. 22 and 23, the arrow f11 represents the force acting on the second cam-incorporated gear 36 from the shutter setting lever 51; more specifically, the arrow f11 shown in FIG. 22 represents a combination of the biasing force (restoring force) of the setting lever restoring spring 55 and the shutter charge load on the second cam-incorporated gear 36, and the arrow f11 shown in FIG. 23 represents the biasing force (restoring force) of the setting lever restoring spring 55. In FIGS. 22 and 23, the arrow f12 represents the biasing force (restoring force) of the charge lever restoring spring 54, and the arrow f13 represents the pressure force of the second cam follower 50*g* on a cam surface of the second shutter control cam 42. In addition, in FIGS. 22 and 23, the arrow r11 represents the radial distance from the center of rotation of the shutter charge lever 50 (i.e., the axis of the rotational shaft 50*x*) to the arrow f11, the arrow r12 represents the radial distance from the center of rotation of the shutter charge lever 50 (i.e., the axis of the rotational shaft 50*x*) to the arrow f12, the arrow r13 represents the radial distance from the center of rotation of the shutter charge lever 50 (i.e., the axis of the rotational shaft 50*x*) to the arrow f13, and the arrow r15 represents the radial distance from the center of rotation of the second cam-incorporated gear 36 (i.e., the axis of the rotational shaft 36*x*) to the arrow f13. Additionally, in FIGS. 22 and 23, the arrow M11 represents the rotational moment of the shutter charge lever 50 produced by the forces f11 and f12, and the arrow M13 represents the rotational load moment produced in the second friction gear 81 by the friction spring 84 in the second frictional gear mechanism 80. In the following descriptions, T11 designates the surplus torque acting on the second cam-incorporated gear 36 by the shutter charge lever 50 in the same rotational direction as the direction of rotation (clockwise direction) of the second cam-incorporated gear 36, T12 designates the load torque acting on the second cam-incorporated gear 36 by the shutter charge lever 50 in the direction (counterclockwise direction) opposite to the direction of rotation of the second cam-incorporated gear 36, and T13 designates the load torque acting on the second cam-incorporated gear 36 by the second friction gear 81 when the second cam-incorporated gear 36 rotates.

When the second cam-incorporated gear 36 rotates from the origin position to the shutter charge completion position, the shutter charge lever 50 (the shutter charge system) serves as a source of acting the load torque T12 on the second cam-incorporated gear 36 because the second shutter control cam 42 continues to press the shutter charge lever 50 toward the charge position (in which the second cam follower 50*g* is positioned at the cam-axis separated position thereof) against the biasing forces of the charge lever restoring spring 54, the setting lever restoring spring 55 and the shutter charge load. The load torque T12 during the operation of the second cam-incorporated gear 36 from the origin position to the shutter charge completion position can be determined by the following equation (5):

$$T12 = f13 \times r15 \qquad (5)$$

wherein f13=M11/r13, M11=f11×r11+f12×r12.

At the origin position of the second cam-incorporated gear 36, as shown in FIG. 17, since the shutter charge lever 50 is held in the charge release position (in which the second cam follower 50*g* is positioned at the cam-axis vicinity position thereof) by the contact engagement between the stopper portion 50*e* and the swing limit protrusion 13*e* and since the second cam follower 50*g* faces the relief cam portion 42*c* of the second shutter control cam 42 with a slight distance therebetween, T11 is equal to zero (T11=0) and T12 is equal to zero (T12=0), so that the second cam-incorporated gear 36 receives no torque in a rotational direction from the shutter charge lever 50.

Figure 8:
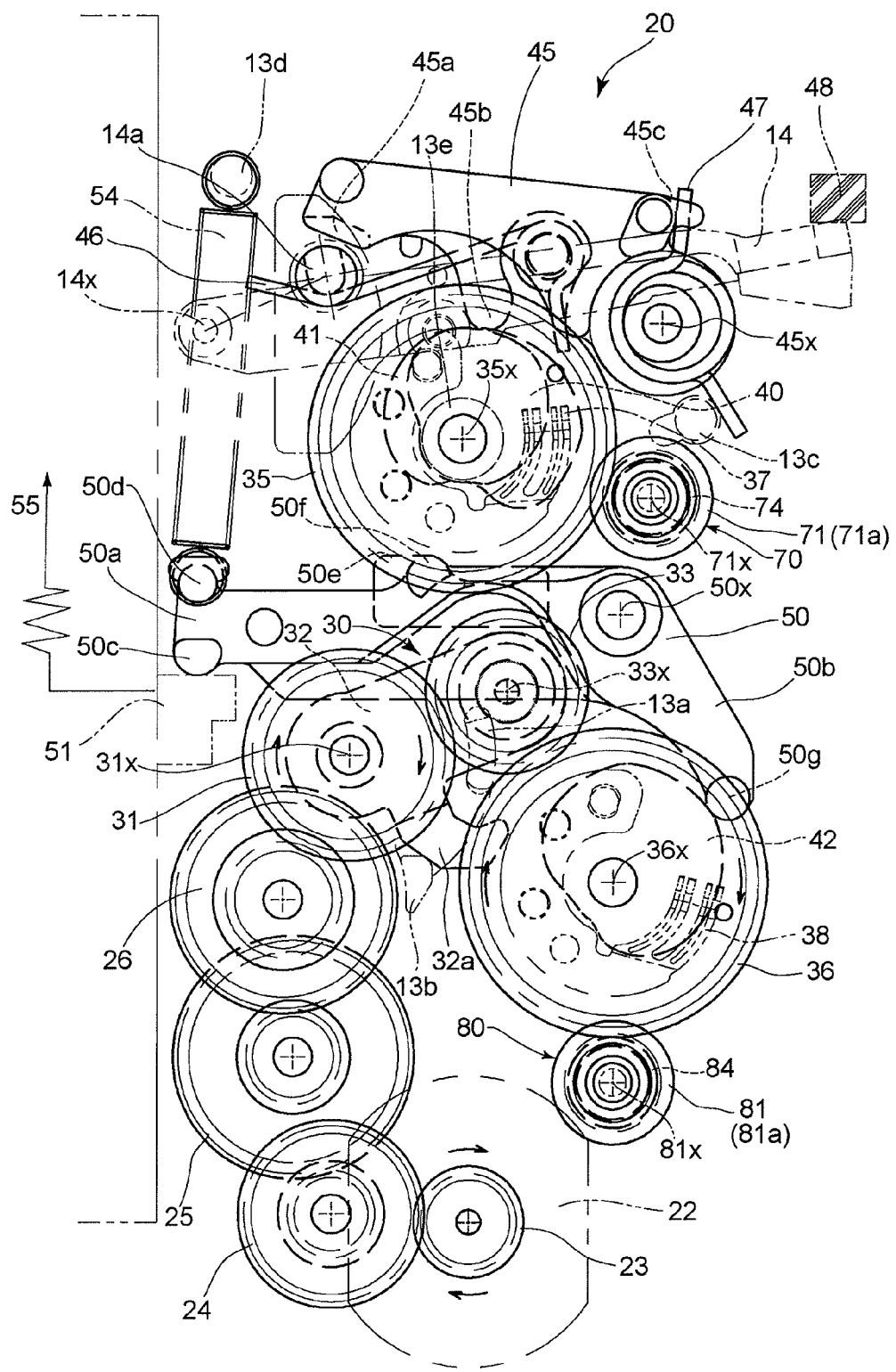
FIG. 8 is a side elevational view of the mirror/shutter drive mechanism in a state where the second cam-incorporated gear has been rotated from the state shown in FIG. 7 and a charge operation performed by the shutter charge lever has been completed.
Figure 18:
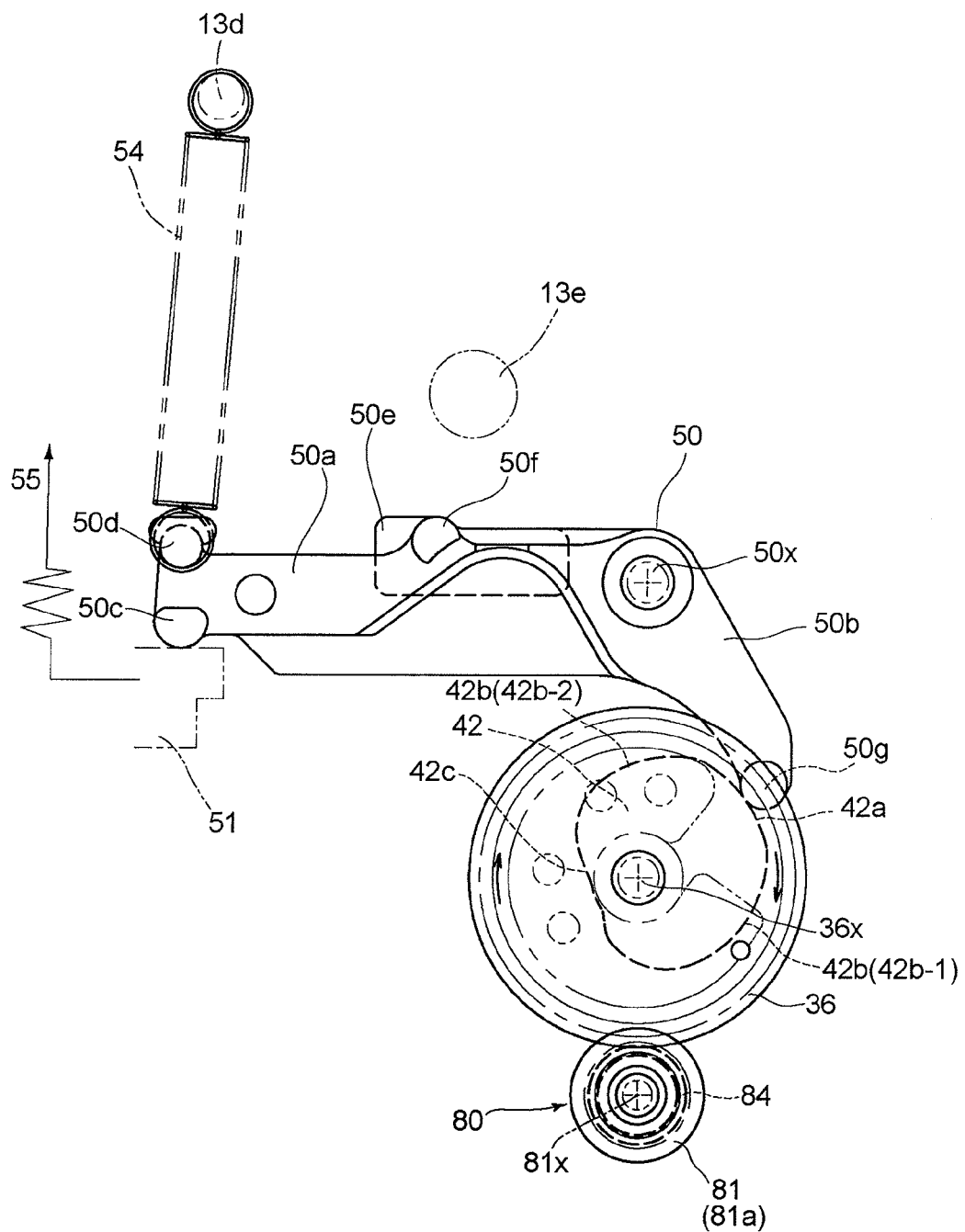
FIG. 18 is a side elevational view of the second cam-incorporated gear, the shutter charge lever and associated elements, showing the relative position between the second cam-incorporated gear and the shutter charge lever when the second cam-incorporated gear is positioned at the shutter charge completion position shown in FIG. 8.

FIG. 22 shows a state where the second cam-incorporated gear 36 is in the process of being rotated toward the shutter charge completion position shown in FIGS. 8 and 18 from the origin position shown in FIGS. 7 and 17. As shown in FIG. 22, the second cam follower 50*g* of the shutter charge lever 50 moves from a state of being spaced from the relief cam portion 42*c* of the second shutter control cam 42 to a state of being in contact with the first non-constant-radius cam portion 42*b*-1 and pushed up thereby, which causes the shutter charge lever 50 to commence rotating toward the charge position of the shutter charge lever 50 (this rotation is shown by K6 or K22 in FIG. 14). Thereupon, the direction of action of f13 does not coincide with a radial direction of the rotational shaft 36*x*, and r15 becomes unequal to zero (i.e., r15≠0), so that the rotational moment M11 of the shutter charge lever 50 comes to act as the load torque T12 on the second cam-incorporated gear 36. In other words, no surplus torque acts on the second cam-incorporated gear 36 by the shutter charge lever 50, so that the surplus torque T11 is equal to zero (T11=0). Therefore, a load torque which corresponds in magnitude to the sum of the load torque T12 that is caused by the shutter charge lever 50 and the load torque T13 that is caused by the second friction gear 81 acts on the second cam-incorporated gear 36, and no surplus torque acts on the second cam-incorporated gear 36.

In a state where the second cam-incorporated gear 36 has reached the shutter charge completion position shown in FIGS. 8 and 18, the second cam follower 50*g* of the shutter charge lever 50 comes in contact with the constant-radius portion 42*a* of the second shutter control cam 42, so that the shutter charge lever 50 is held in the charge position (in which the second cam follower 50*g* is positioned at the cam-axis separated position thereof) by contact engagement of the second cam follower 50g and the constant-radius portion 42a of the second shutter control cam 42. In this state where the second cam follower 50g and the constant-radius portion 42a are in contact with each other, r15 is equal to zero (r15=0). As a result, the load torque T12 becomes zero. Therefore, at this time the second cam-incorporated gear 36 receives no torque in a rotational direction from the shutter charge lever 50.

When the second cam-incorporated gear 36 rotates from the shutter charge completion position shown in FIGS. 8 and 18 to the origin position shown in FIGS. 7 and 17, the shutter charge lever 50 (the shutter charge system) serves as a source of the surplus torque T11 acting on the second cam-incorporated gear 36 because the shutter charge lever 50 rotates toward the charge release position (in which the second cam follower 50g is positioned at the cam-axis vicinity position thereof) while the second cam follower 50g presses the second shutter control cam 42 by the biasing forces of the charge lever restoring spring 54 and the setting lever restoring spring 55, conversely to the operation at the time the second-incorporated gear 36 rotates from the origin position to the shutter charge completion position. The surplus torque T11 during the operation of the second cam-incorporated gear 36 from the shutter charge completion position to the origin position can be determined by the following equation (6):

$$T11 = f13 \times r15 \qquad (6)$$

wherein f13=M11/r13, M11=f11×r11+f12×r12.

FIG. 23 shows a state where the second cam-incorporated gear 36 is in the process of being rotated toward the origin position shown in FIGS. 7 and 17 from the shutter charge completion position shown in FIGS. 8 and 18. As shown in FIG. 23, the second cam follower 50g of the shutter charge lever 50 changes the contact position thereof with the second shutter control cam 42 from the constant-radius cam portion 42a to the second non-constant cam portion 42b-2, which causes the shutter charge lever 50 to rotate toward the charge release position (this rotation is shown by K12 or K28 in FIG. 14). Thereupon, the direction of action of f13 changes so that r15 becomes unequal to zero (i.e., r15≠0), so that the rotational moment M11 of the shutter charge lever 50 comes to act as the surplus torque T11 on the second cam-incorporated gear 36. At this stage, a load torque (counter torque) which exclusively counters the surplus torque T11 that acts on the second cam-incorporated gear 36 by the shutter charge lever 50 acts on the second cam-incorporated gear 36, namely, the rotational load moment M13 in the second frictional gear mechanism 80 (i.e., which is applied to the second friction gear 81 by the friction spring 84) is set so as to impose such a counter torque on the second cam-incorporated gear 36 via the second friction gear 81, i.e., so as to satisfy the condition "T11≦T13."

Accordingly, in the live-view mode photography operational-sequence, the second frictional gear mechanism 80 imposes the load torque T13 on the second cam-incorporated gear 36 so as to satisfy the condition "T11≦T13" at all time in the rotation section of the second cam-incorporated gear 36 from the shutter charge completion position to the origin position. With this structure, the relationship in action of forces between the planet gear 33 as a driver and the second cam-incorporated gear 36 as a follower (driven member) is maintained, which makes it possible to make the planet gear 33 reliably remain engaged with the second cam-incorporated gear 36.

As can be understood from the above descriptions, in the present embodiment of the power transmission mechanism, i.e., the mirror/shutter drive mechanism 20, when the first cam-incorporated gear 35 and the second cam-incorporated gear 36 are selectively driven to rotate by the planetary gear mechanism 30, even if the surplus torque acts on the first cam-incorporated gear 35 or the second cam-incorporated gear 36 by the mirror drive lever 45 or the shutter charge lever 50, the first frictional gear mechanism 70 and the second frictional gear mechanism 80 exert a load torque on the first cam-incorporated gear 35 or on the second cam-incorporated gear 36 which has a magnitude for canceling out the surplus torque on the first cam-incorporated gear 35 or the second cam-incorporated gear 36, respectively, which makes it possible to bring the planet gear 33 into engagement with either of the two cam-incorporated gears 35 and 36 with reliability, thus making it possible to achieve a high-precision driving.

The present invention is not limited to the above described embodiment of the power transmission mechanism. For instance, although the present invention has been applied to the above described embodiment of the power transmission mechanism that serves as a power transmission mechanism for constructing live view mode in an SLR digital camera, the present invention can be applied to another type of power transmission mechanism. In addition, in the case where the power transmission mechanism includes the two cam-incorporated gears 35 and 36 like the above described embodiment of the power transmission mechanism, it is most desirable that the mirror/shutter drive mechanism 20 be equipped with the first frictional gear mechanism 70 and the second frictional gear mechanism 80 for the first cam-incorporated gear 35 and the second cam-incorporated gear 36, respectively; however, it is possible that the present invention be applied only to one of the first cam-incorporated gear 35 and the second cam-incorporated gear 36. Additionally, the planetary gear mechanism 30 is of a type in which the plant gear 33 is selectively engaged with the two cam-incorporated gears 35 and 36 in the above described embodiment of the power transmission mechanism, it is possible that another type of planetary gear mechanism be constructed such that it includes only one cam-incorporated gear with which the planetary gear is engageable and that the planetary gear is engaged with another type of gear upon being disengaged from the one cam-incorporated gear.

Additionally, although the above described embodiment of the power transmission mechanism is structured so that the first frictional gear mechanism 70 and the second frictional gear mechanism 80 impose a load torque on the first friction gear 71 and the second friction gear 81 by the friction spring 74 and the friction spring 84, respectively, each of which is a compression coil spring, it is possible for each of the first frictional gear mechanism 70 and the second frictional gear mechanism 80 to be replaced by a different type of damping mechanism. For instance, a damping mechanism can be alternatively provided which magnetically imposes a rotational resistance on a rotor corresponding to the first friction gear 71 of the first frictional gear mechanism 70 or the second friction gear 81 of the second frictional gear mechanism 80.

Figure 24:
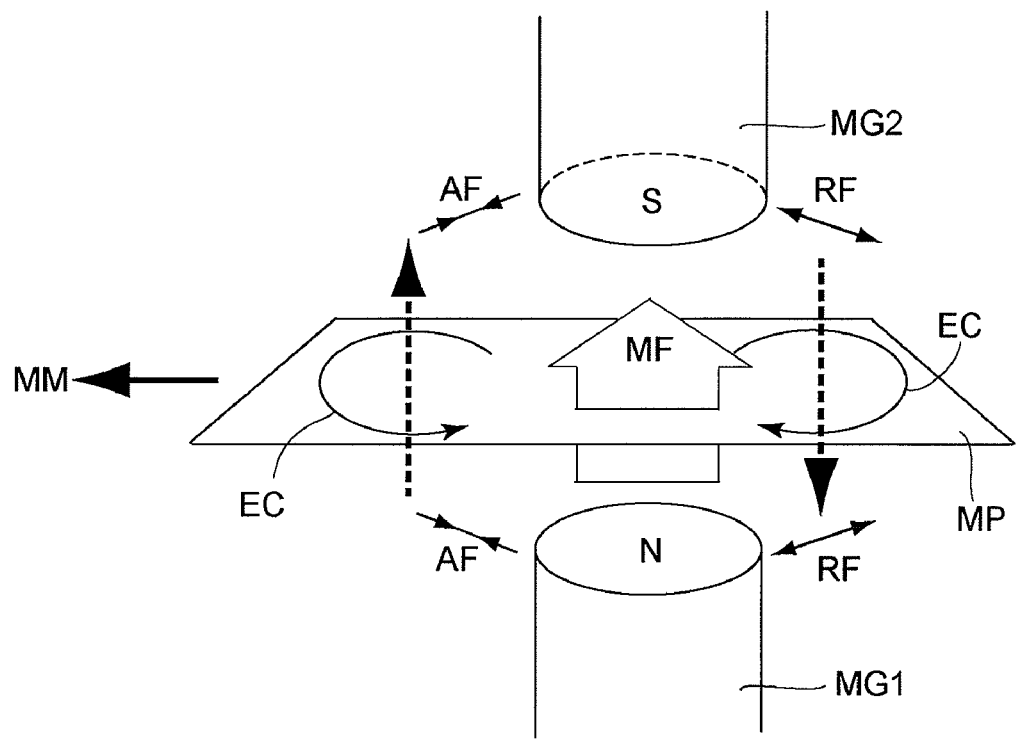
FIG. 24 is a schematic diagram showing the damping mechanism using magnetism.

FIG. 24 schematically shows an example of such a magnetic damping mechanism. The magnetic damping mechanism is provided with two magnets MG1 and MG2 which are arranged so as to produce a magnetic field MF in the vertical direction with respect to a plane in which the rotor rotates, and the rotor is provided on a portion of this plane with a non-magnetic metal plate MP. The two magnets MG1 and MG2 can be mounted on a stationary member such as the mirror box 13 of the previous embodiment shown in FIG. 1. In FIG. 24, the direction of displacement of the non-magnetic metal plate MP caused by rotation of the rotor is shown by a linear arrow MM for the sake of convenience, and a movement of the non-magnetic metal plate MP in the direction of the linear arrow MM (leftward with respect to FIG. 24) increases the density of magnetic flux passing through in a portion on the non-magnetic metal plate MP which approaches the magnets MG1 and MG2 (i.e., the right-hand side portion on the non-magnetic metal plate MP with respect to FIG. 24) and decreases the density of magnetic flux passing through in another portion on the non-magnetic metal plate MP which moves away from the magnets MG1 and MG2 (i.e., the left-hand side portion on the non-magnetic metal plate MP with respect to FIG. 24). Thereupon, electromagnetic induction causes an eddy current EC to be induced so as to cancel out the variation in density of magnetic flux on the non-magnetic metal plate MP. The current thus induced produces a magnetic field, and this magnetic field causes attractive force AF to be produced between the magnets MG1 and MG2 in a portion on the non-magnetic metal plate MP which moves away from the magnets MG1 and MG2 and causes repulsive force RF to be produced between the magnets MG1 and MG2 in another portion on the non-magnetic metal plate MP which approaches the magnets MG1 and MG2. This makes it possible to move the non-magnetic metal plate MP, i.e., to impose resistance to rotation of the rotor. Each of the magnets MG1 and MG2 can be made of either a permanent magnet or an electromagnet. If each magnet MG1 and MG2 is made of an electromagnet, the magnetic force becomes controllable, and therefore, it is possible to generate a control effect by generating a magnetic force only during rotation of the rotor, or such control as to suppress loads on the rotor at such time when the rotor starts rotating from a resting state is also possible.

As another embodiment of the damping mechanism using magnetism, it is possible to install a magnet and a ferromagnetic metal (yoke) such as iron to one and the other of the rotor side and the stationary member side, respectively, to impose rotational resistance on the rotor by the attractive power of the magnet exerted on the ferromagnetic metal.

Additionally, as another embodiment of the damping mechanism, it is possible to adopt such a structure as to press a damping pad (damping member) against a rotational cylindrical surface (outer peripheral surface) of a rotor sideway which corresponds to the friction gear 71 or 81 of the first or second cam-incorporated gear 35 or 36 of the above described embodiment of the damping mechanism. The damping pad imposes frictional resistance on the rotor by contacting the rotational cylindrical surface and releases such frictional resistance by being disengaged from the rotational cylindrical surface.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A power transmission mechanism comprising:
a cam-incorporated gear which rotates in one rotational direction by a driving force transmitted from a drive source via a planet gear when engaged with said planet gear, wherein said cam-incorporated gear stops rotating when disengaged from said planet gear;
a driven member which includes a follower which contacts at least one surface cam formed on said cam-incorporated gear, said driven member being driven in accordance with the rotation of said cam-incorporated gear in said one rotational direction, and exerting a surplus torque on said cam-incorporated gear in said one rotational direction thereof so as to increase said rotation of said cam-incorporated gear in said one rotational direction, said surplus torque being independent of a torque exerted on said cam-incorporated gear by said drive source; and
a damping mechanism which continuously exerts a load torque on said cam-incorporated gear in a rotational direction opposite to said one rotational direction of said cam-incorporated gear so as to cancel out said surplus torque.

2. The power transmission mechanism according to claim 1, wherein said damping mechanism comprises a frictional gear mechanism including:
a friction gear engaged with said cam-incorporated gear; and
a friction spring which imposes a load on said friction gear.

3. The power transmission mechanism according to claim 2, wherein said cam-incorporated gear comprises a first cam-incorporated gear and a second cam-incorporated gear with which said planet gear is selectively engaged,
wherein said frictional gear mechanism comprises a first frictional gear mechanism including a first said friction gear which is engaged with said first cam-incorporated gear, and a second frictional gear mechanism including a second said friction gear which is engaged with said second cam-incorporated gear,
wherein when said first cam-incorporated gear is rotated by the driving force transmitted from said drive source via said planet gear, said first friction gear rotates while exerting said load torque on said first cam-incorporated gear, wherein rotation of said second cam-incorporated gear and said second friction gear are stopped, and
wherein when said second cam-incorporated gear is rotated by the driving force transmitted from said drive source via said planet gear, said second friction gear rotates while exerting said load torque on said second cam-incorporated gear, wherein rotation of said first cam-incorporated gear and said first friction gear are stopped.

4. The power transmission mechanism according to claim 2, further comprising a pair of gear support members which support said friction gear in a manner to prevent said friction gear from moving in a direction of the rotational axis thereof,
wherein said friction spring comprises a compression spring installed between one of said pair of support members and said friction gear.

5. The power transmission mechanism according to claim 1, wherein said damping mechanism magnetically imposes a rotational resistance on one of said cam-incorporated gear and a gear engaged with said cam-incorporated gear.

6. The power transmission mechanism according to claim 1, wherein said driven member comprises at least one swingable member which is swingable between a first swing limit at which said follower is positioned in a close vicinity of a rotational shaft of said cam-incorporated gear and a second swing limit at which said follower is positioned away from said rotational shaft, said swingable member being biased toward said first swing limit, and
wherein, said swingable member exerts said surplus torque on said cam-incorporated gear when said swingable member swings from said second swing limit to said first swing limit.

7. The power transmission mechanism according to claim 6, wherein swing operations of two of said swingable members are controlled by one and the other of two of said surface cams which are formed on said cam-incorporated gear, respectively, and wherein, when one of said two swingable members exerts said surplus torque on said cam-incorporated gear, the other of said two swingable members exerts a load torque on said cam-incorporated gear in a rotational direction opposite to said one rotational direction of said cam-incorporated gear, in which said one of said two swingable members exerts said surplus torque on said cam-incorporated gear, independently of said damping mechanism.

8. The power transmission mechanism according to claim 7, wherein said cam-incorporated gear is installed in an imaging apparatus, said imaging apparatus comprising:
   a mirror which is swingable between a viewing position in which light from an imaging optical system is reflected by said mirror to travel toward a viewfinder optical system, and a retracted position in which said light from said imaging optical system is incident on an image pickup medium without being reflected by said mirror; and
   a shutter which prevents said light that is passed through said imaging optical system from being incident on said image pickup medium when shut, and allows said light that is passed through said imaging optical system to be incident on said image pickup medium when opened,
   wherein one of said two swingable members includes a mirror drive lever which holds said mirror in said viewing position when positioned in said first swing limit and holds said mirror in said retracted position when positioned in said second swing limit, and
   wherein the other of said swingable members includes a shutter charge lever which allows said shutter to travel when positioned in said first swing limit and charges said shutter when positioned in said second swing limit.

9. The power transmission mechanism according to claim 6, wherein said cam-incorporated gear is installed in an imaging apparatus including a shutter which prevents light that is passed through an imaging optical system from being incident on an image pickup medium when shut, and allows said light that is pass through said imaging optical system to be incident on said image pickup medium when opened, and
   wherein said swingable member includes a shutter charge lever which allows said shutter to travel when positioned in said first swing limit and charges said shutter when positioned in said second swing limit.

10. The power transmission mechanism according to claim 6, wherein said power transmission mechanism is incorporated in an imaging apparatus, said imaging apparatus comprising:
    a mirror swingable between a viewing position in which light from an imaging optical system is reflected by said mirror to travel toward a viewfinder optical system and a retracted position in which said light from said imaging optical system is incident on an image pickup medium without being reflected by said mirror; and
    a shutter which prevents said light that is passed through said imaging optical system from being incident on said image pickup medium when shut, and allows said light that is passed through said imaging optical system to be incident on said image pickup medium when opened,
    wherein said swingable member includes a mirror drive lever for holding said mirror in said viewing position when positioned in said first swing limit and for holding said mirror in said retracted position when positioned in said second swing limit; and a shutter charge lever which allows said shutter to travel when positioned in said first swing limit and charges said shutter when positioned in said second swing limit,
    wherein said cam-incorporated gear includes a first cam-incorporated gear and a second cam-incorporated gear with which said planet gear is selectively engaged,
    wherein said first cam-incorporated gear includes a mirror-control surface cam for controlling a swing operation of said mirror drive lever, and a first shutter-control surface cam for controlling a swing operation of said shutter charge lever,
    wherein said second cam-incorporated gear includes a second shutter-control surface cam for controlling a swing operation of said shutter charge lever, and
    wherein said damping mechanism includes a first damping mechanism which exerts said load torque on said first cam-incorporated gear, and a second damping mechanism which exerts said load torque on said second cam-incorporated gear.

11. The power transmission mechanism according to claim 10, wherein said first damping mechanism comprises a first frictional gear mechanism including a first friction gear, which is engaged with said first cam-incorporated gear, and a first friction spring which imposes a load on said first friction gear,
    wherein said second damping mechanism comprises a second frictional gear mechanism including a second friction gear, which is engaged with said second cam-incorporated gear, and a second friction spring which imposes a load on said second friction gear,
    wherein said first friction gear and said second friction gear are rotatably supported by a mirror box, in which said mirror is swingably supported,
    wherein said first friction spring is provided between said first friction gear and said mirror box, and
    wherein said second friction spring is provided between said second friction gear and said mirror box.

12. The power transmission mechanism according to claim 1, wherein said driving force is transmitted from said drive source to said cam-incorporated gear via a reduction gear train and said planet gear.

13. The power transmission mechanism according to claim 1, wherein said power transmission mechanism is incorporated in an SLR camera.

14. A power transmission mechanism of an imaging apparatus, comprising:
    a mirror swingable between a viewing position in which light from an imaging optical system is reflected by said mirror to travel toward a viewfinder optical system and a retracted position in which said light from said imaging optical system is incident on an image pickup medium without being reflected by said mirror;
    a cam-incorporated gear which rotates in one rotational direction by a driving force transmitted from a drive source via a planet gear when engaged with said planet gear, and stops rotating when disengaged from said planet gear;
    a mirror drive lever which includes a follower which comes in sliding contact with a surface cam formed on said cam-incorporated gear, wherein said mirror drive lever is swingable between a first swing limit at which said follower is positioned in a vicinity of a rotational shaft of said cam-incorporated gear and a second swing limit at which said follower is positioned away from said rotational shaft of said cam-incorporated gear, holds said mirror in said viewing position when positioned in said first swing limit, holds said mirror in said retracted position when positioned in said second swing limit, and exerts a surplus torque on said cam-incorporated gear in a rotational direction thereof so as to increase said rotation of said cam-incorporated gear in said rotational direction when rotating from said second swing limit to said first swing limit, said surplus torque being independent of a torque exerted on said cam-incorporated gear by said drive source; and a damping mechanism which continuously exerts a load torque on said cam-incorporated gear in a rotational direction opposite to said rotational direction of said cam-incorporated gear so as to cancel out said surplus torque.

15. A power transmission mechanism of an imaging apparatus, comprising:

a shutter which prevents light from being incident on an image pickup medium when shut, and allows said light to be incident on said image pickup medium when opened;

a cam-incorporated gear which rotates in one rotational direction by a driving force transmitted from a drive source via a planet gear when engaged with said planet gear, and stops rotating when disengaged from said planet gear;

a shutter charge lever which includes a follower which comes in sliding contact with a surface cam formed on said cam-incorporated gear, wherein said shutter charge lever is swingable in accordance with a rotation of said cam-incorporated gear between a first swing limit at which said follower is positioned in a vicinity of a rotational shaft of said cam-incorporated gear and a second swing limit at which said follower is positioned away from said rotational shaft of said cam-incorporated gear, allows said shutter to travel when positioned in said first swing limit and makes said shutter charged when positioned in said second swing limit, and exerts a surplus torque on said cam-incorporated gear in a rotational direction thereof so as to increase said rotation of said cam-incorporated gear in said rotational direction when rotating from said second swing limit to said first swing limit, said surplus torque being independent of a torque exerted on said cam-incorporated gear by said drive source; and a damping mechanism which continuously exerts a load torque on said cam-incorporated gear in a rotational direction opposite to said rotational direction of said cam-incorporated gear so as to cancel out said surplus torque.

* * * * *